(12) United States Patent
Yamaguchi et al.

(10) Patent No.: US 10,571,246 B2
(45) Date of Patent: Feb. 25, 2020

(54) IMAGING PROCESSING APPARATUS, DISTANCE MEASURING APPARATUS AND PROCESSING SYSTEM

(71) Applicant: KABUSHIKI KAISHA TOSHIBA, Tokyo (JP)

(72) Inventors: Jun Yamaguchi, Kanagawa (JP); Yusuke Moriuchi, Kanagawa (JP); Nao Mishima, Tokyo (JP); Takayuki Sasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 15/908,506

(22) Filed: Feb. 28, 2018

(65) Prior Publication Data

US 2019/0014262 A1    Jan. 10, 2019

(30) Foreign Application Priority Data

Jul. 5, 2017 (JP) .................... 2017-132192

(51) Int. Cl.
*H04N 5/232* (2006.01)
*G06T 5/20* (2006.01)
(Continued)

(52) U.S. Cl.
CPC ............ *G01B 11/026* (2013.01); *G06T 5/003* (2013.01); *G06T 5/20* (2013.01); *G06T 7/55* (2017.01); *G06T 7/571* (2017.01); *H04N 5/2254* (2013.01)

(58) Field of Classification Search
None
See application file for complete search history.

(56) References Cited

U.S. PATENT DOCUMENTS 6,118,475 A    9/2000 Iijima et al.
6,721,465 B1 *  4/2004 Nakashima ............... G06K 9/20
                                                          358/474
(Continued)

FOREIGN PATENT DOCUMENTS

JP           8-43055      2/1996
JP       2016-102733      6/2016
(Continued)

OTHER PUBLICATIONS

Sakashita; "Processing Apparatus and Processing System", U.S. Appl. No. 15/686,282, filed Aug. 25, 2017.
(Continued)

*Primary Examiner* — Quan Pham
(74) *Attorney, Agent, or Firm* — Finnegan, Henderson, Farabow, Garrett & Dunner, L.L.P.

(57) ABSTRACT

According to one embodiment, an image processing apparatus includes a memory and one or more processors. The one or more processors are electrically connected to the memory, and calculate blur correction information to make a blur of a first shape of an object approach a blur of a second shape of the object. The first shape of the object is contained in a first component image of one image. The second shape of the object is contained in a second component image of the one image. The one or more processors calculate a distance between an imaging device and the object based on an image distance when the one image is captured and the blur correction information. The image distance is a distance from a lens up to an image forming surface of the object.

10 Claims, 18 Drawing Sheets

(51) Int. Cl.
*G06T 7/571* (2017.01)
*G06T 5/00* (2006.01)
*G01B 11/02* (2006.01)
*G06T 7/55* (2017.01)
*H04N 5/225* (2006.01)

(56) References Cited

U.S. PATENT DOCUMENTS

| | | | |
|---|---|---|---|
| 2011/0249173 A1* | 10/2011 | Li | H04N 5/23212 348/349 |
| 2014/0184748 A1* | 7/2014 | Gharib | G02B 3/0056 348/46 |
| 2015/0043808 A1* | 2/2015 | Takahashi | G06T 5/003 382/154 |
| 2015/0146994 A1* | 5/2015 | Arnison | G06T 7/571 382/254 |
| 2015/0262346 A1* | 9/2015 | Horita | G06T 7/593 348/137 |
| 2015/0319343 A1* | 11/2015 | Gu | G06T 5/10 348/224.1 |
| 2016/0154152 A1 | 6/2016 | Moriuchi et al. | |
| 2016/0173762 A1* | 6/2016 | Ogura | H04N 5/23212 348/349 |
| 2016/0191754 A1* | 6/2016 | Cho | H04N 5/2257 348/357 |
| 2016/0267667 A1* | 9/2016 | Wajs | G06T 7/60 |
| 2016/0330360 A1* | 11/2016 | Powell | H04N 5/2254 |
| 2017/0054910 A1 | 2/2017 | Moriuchi et al. | |
| 2017/0180710 A1* | 6/2017 | Kyung | H04N 5/2356 |
| 2017/0223339 A1* | 8/2017 | Kondo | G06T 7/55 |
| 2017/0353710 A1 | 12/2017 | Sasaki et al. | |
| 2018/0365849 A1 | 12/2018 | Taguchi et al. | |
| 2019/0007670 A1 | 1/2019 | Sakurai et al. | |
| 2019/0080481 A1 | 3/2019 | Yamaguchi et al. | |

FOREIGN PATENT DOCUMENTS

| | | |
|---|---|---|
| JP | 2017-40642 | 2/2017 |
| JP | 2017-220780 | 12/2017 |
| JP | 2019-4424 A | 1/2019 |
| JP | 2019-11971 A | 1/2019 |
| JP | 2019-49457 A | 3/2019 |

OTHER PUBLICATIONS

Sakashita; "Processing Apparatus and Processing System", U.S. Appl. No. 15/690,425, filed Aug. 30, 2017.

Ono; "Route Generation Apparatus, Route Control System and Route Generation Method", U.S. Appl. No. 15/691,934, filed Aug. 31, 2017.

Taguchi; "Processing Device, Image Capture Device, and Automatic Control System", U.S. Appl. No. 15/693,442, filed Aug. 31, 2017.

Mishima; "Processing Apparatus, Imaging Apparatus and Automatic Control System", U.S. Appl. No. 15/704,025, filed Sep. 14, 2017.

* cited by examiner

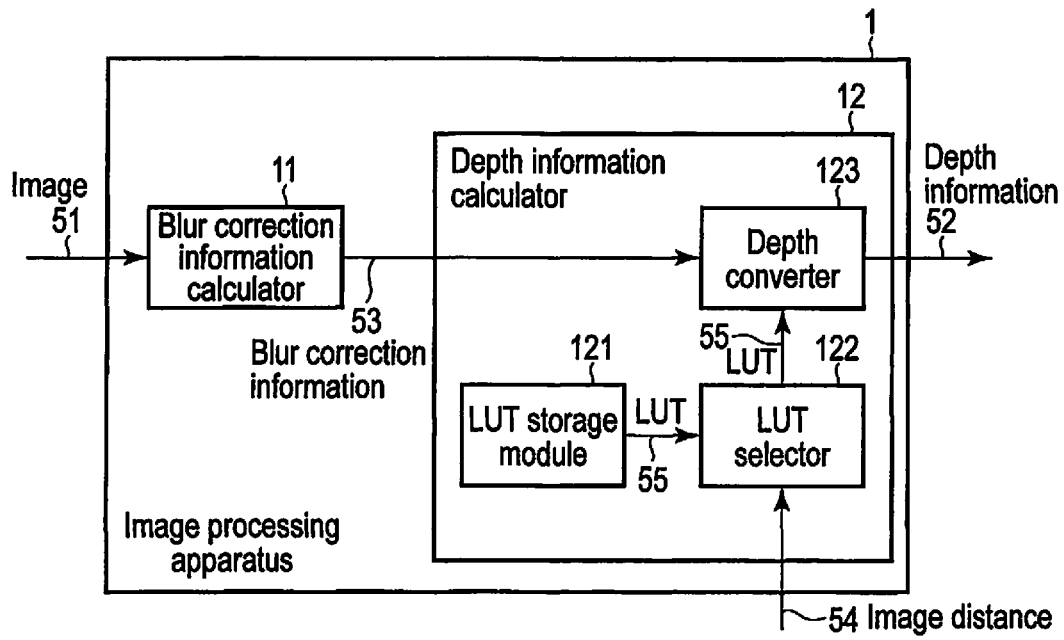
F I G. 1
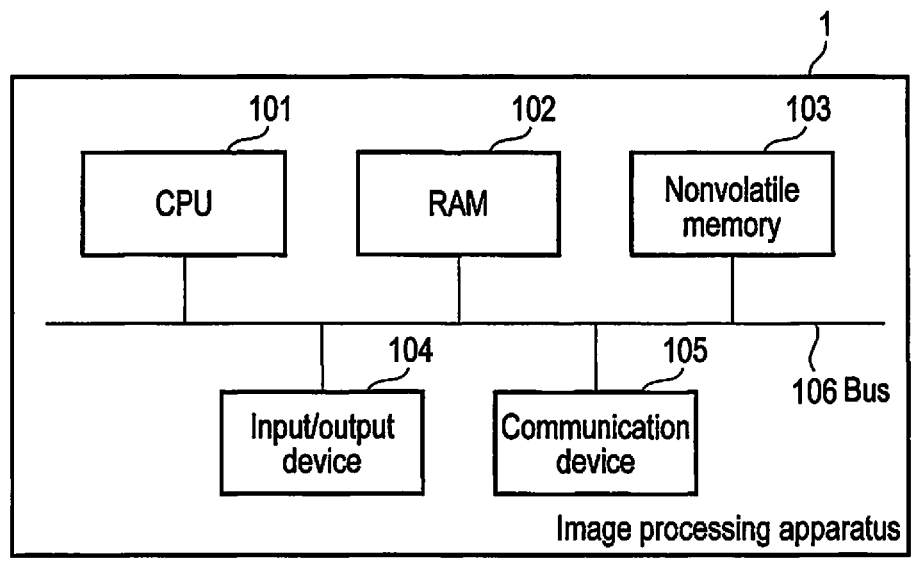
F I G. 2

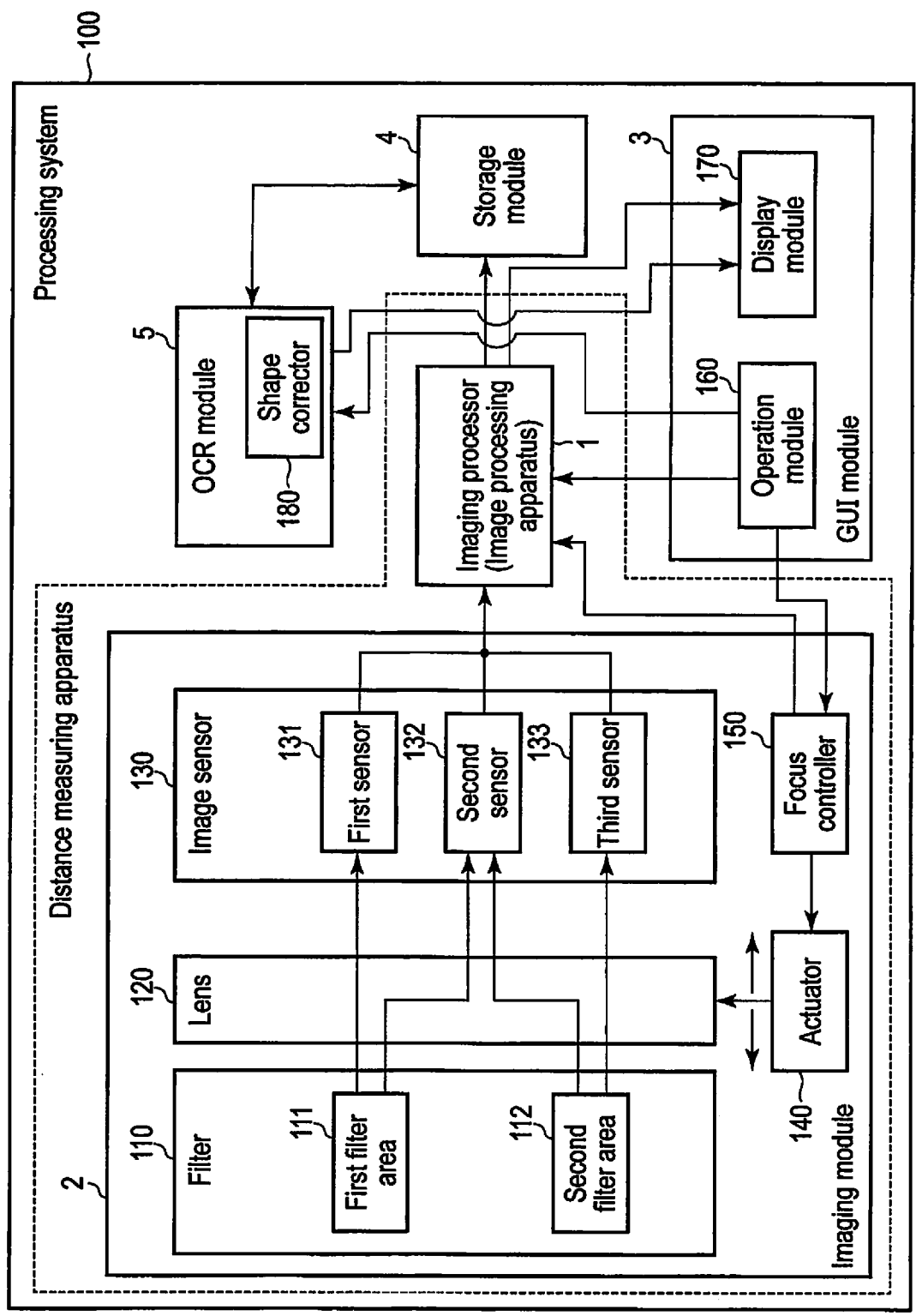
F I G. 3

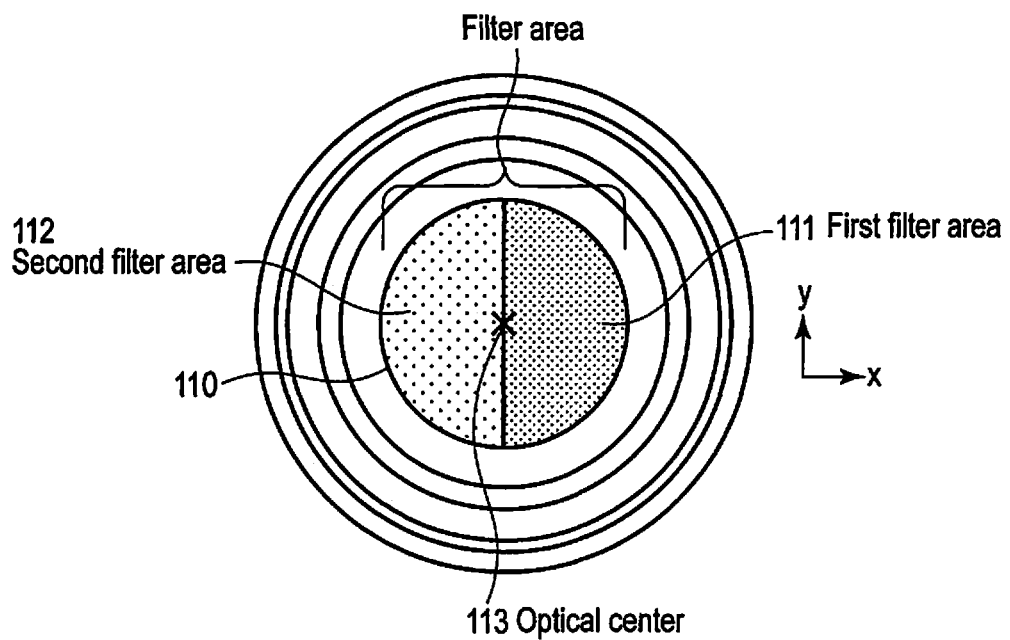
F I G. 6
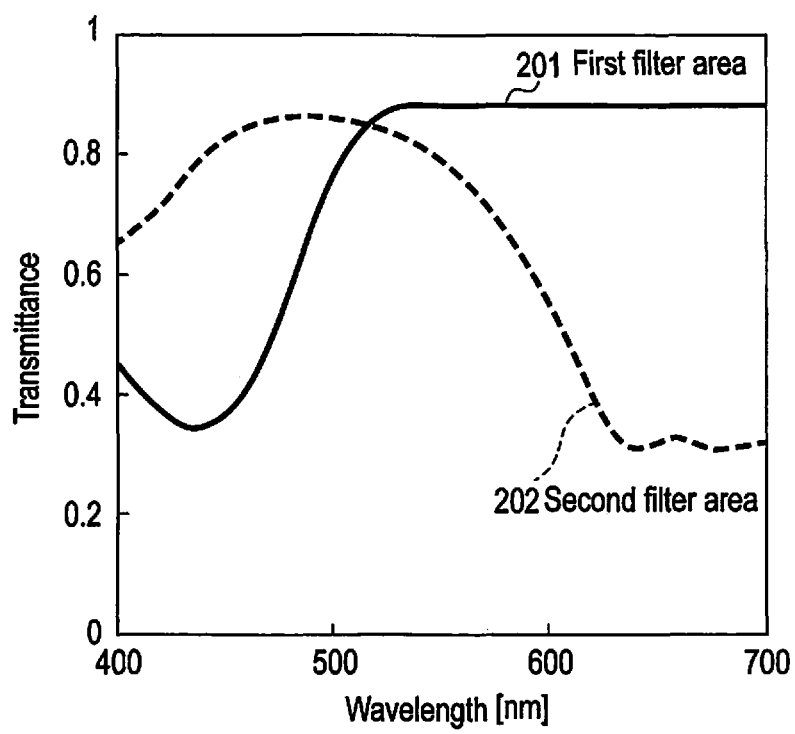
F I G. 7

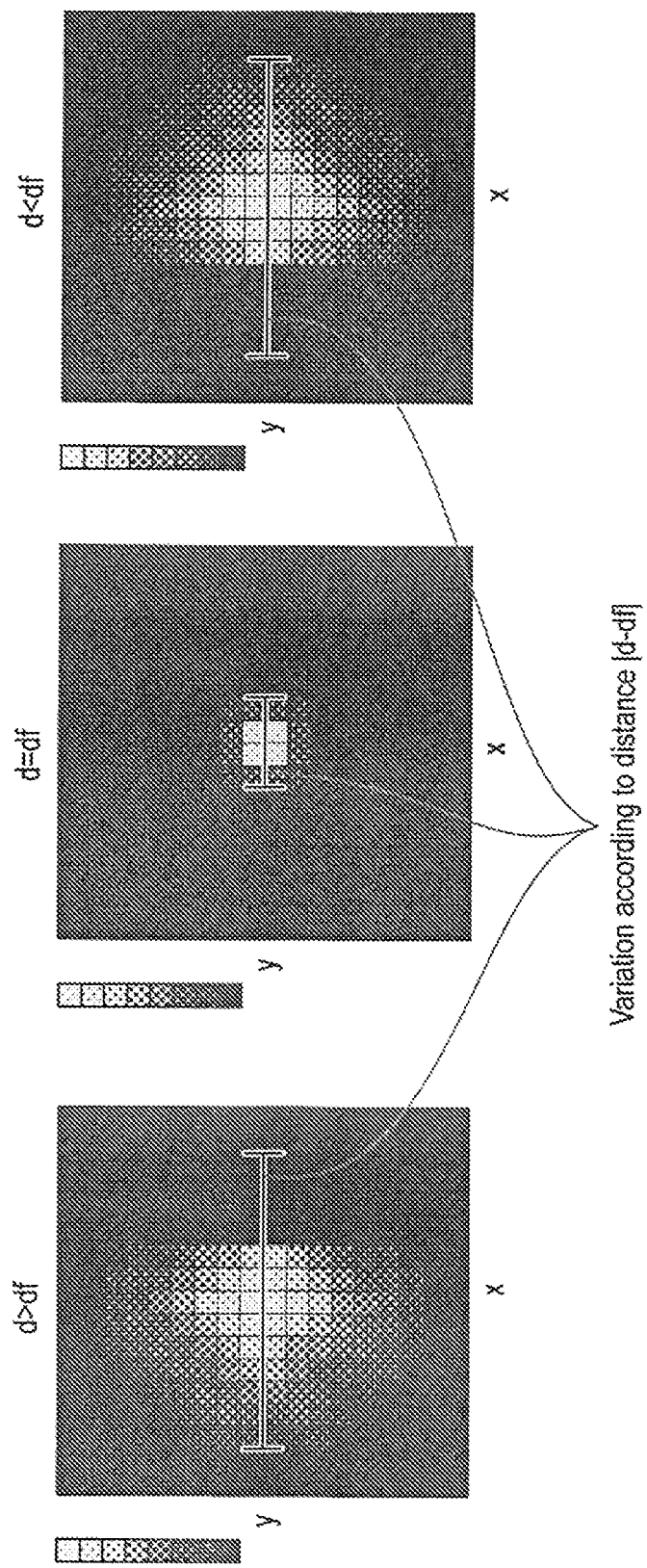
F I G. 10

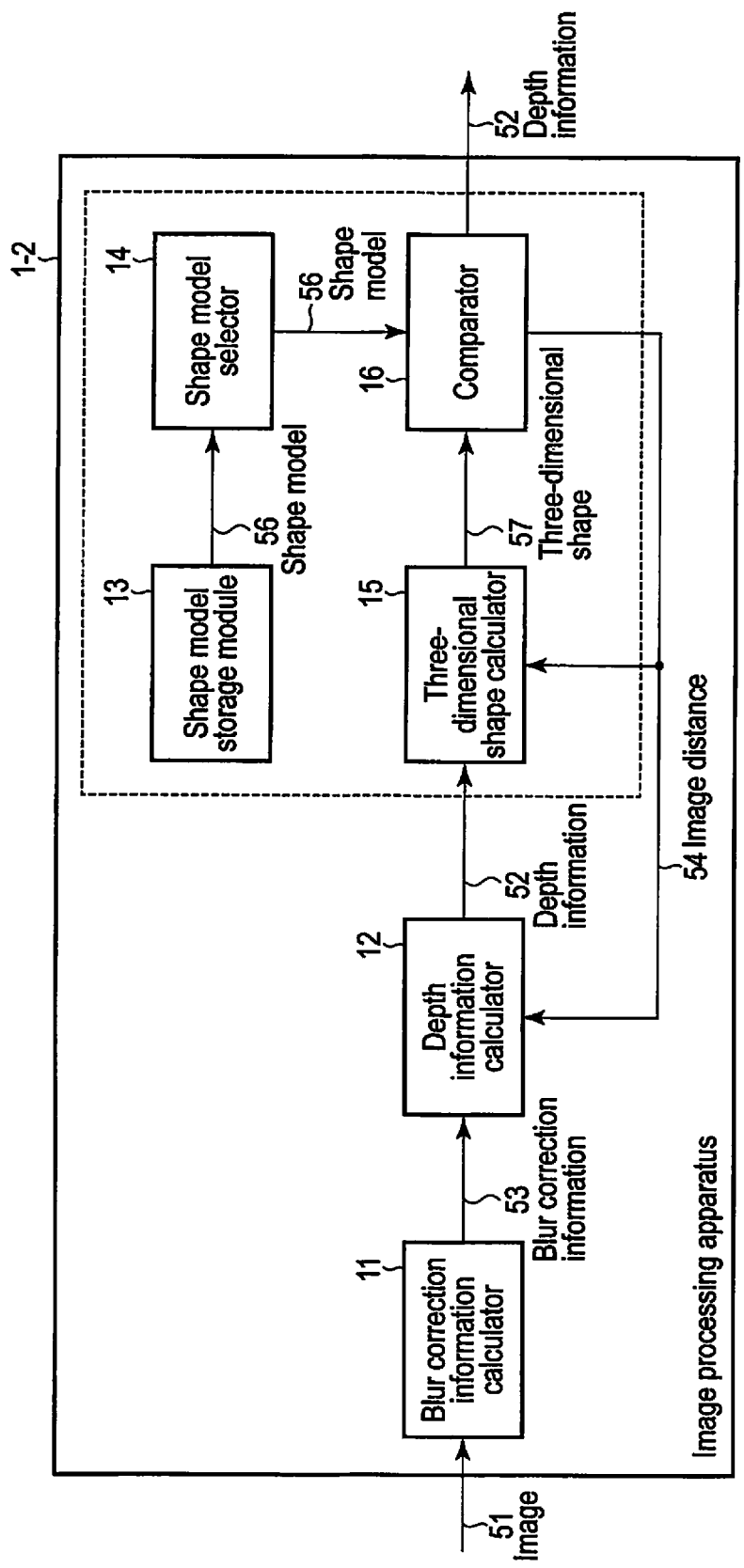
F I G. 17

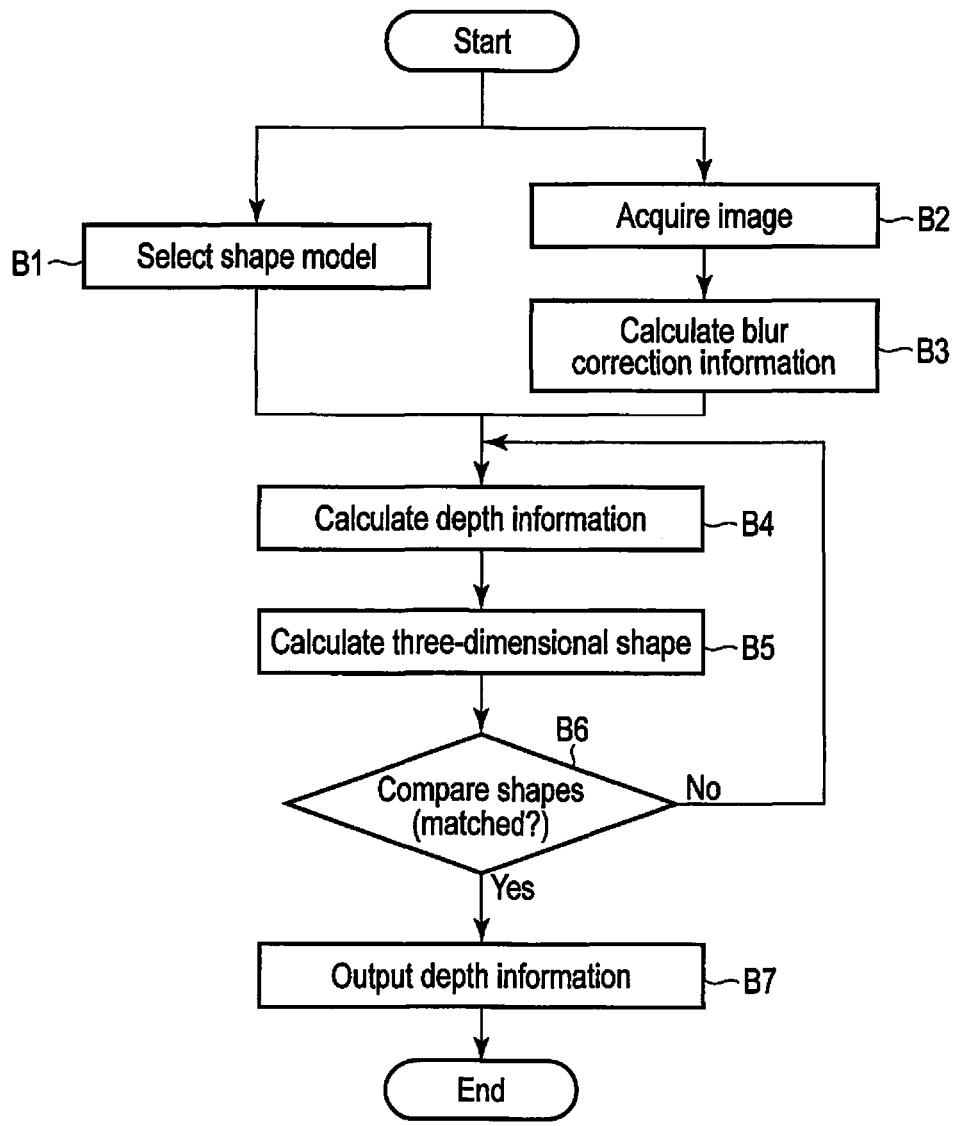
F I G. 21

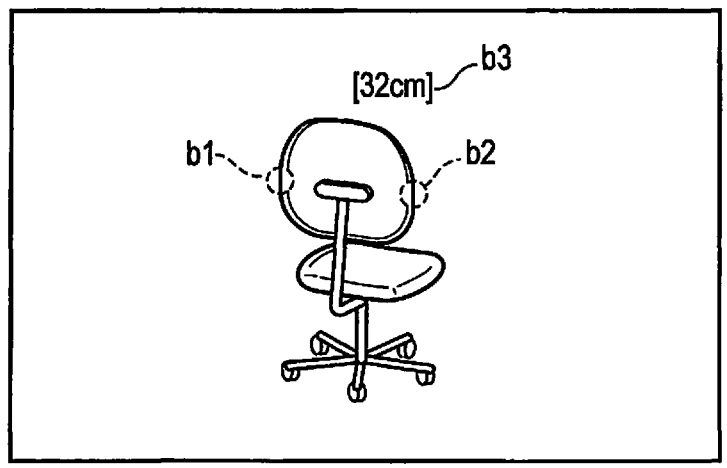
F I G. 22
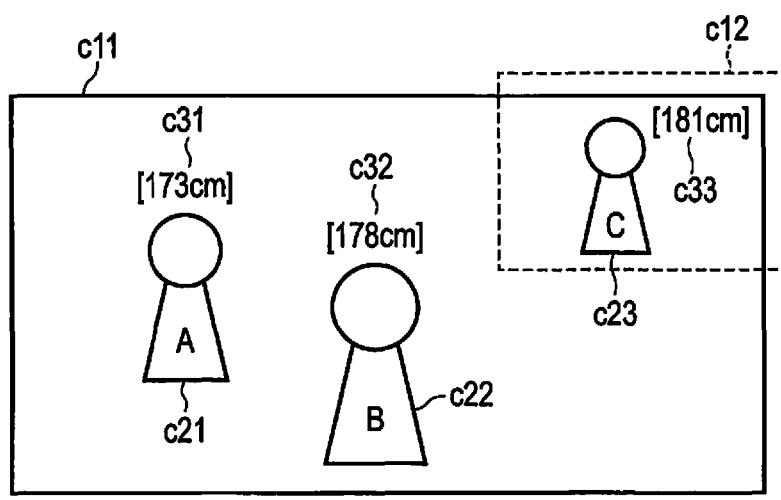
F I G. 23

IMAGING PROCESSING APPARATUS, DISTANCE MEASURING APPARATUS AND PROCESSING SYSTEM

CROSS-REFERENCE TO RELATED APPLICATIONS

This application is based upon and claims the benefit of priority from Japanese Patent Application No. 2017-132192, filed Jul. 5, 2017, the entire contents of which are incorporated herein by reference.

FIELD

Embodiments described herein relate generally to an image processing apparatus, a distance measuring apparatus and a processing system.

BACKGROUND

There is known a technique of acquiring a distance to an object from an image captured by two cameras or a stereo camera (compound-eye camera). In addition, there is recently known a technique of acquiring a distance to an object from an image captured by one camera (monocular camera).

BRIEF DESCRIPTION OF THE DRAWINGS

FIG. 1 is a diagram illustrating an example of a functional block of an image processing apparatus of a first embodiment.

FIG. 2 is a diagram illustrating an example of a hardware configuration of the image processing apparatus of the first embodiment.

FIG. 3 is a diagram illustrating an example of a processing system of the first embodiment.

FIG. 6 is a diagram illustrating an exemplary configuration of a filter of the first embodiment.

FIG. 7 is a diagram illustrating an example of a transmittance characteristic of a filter area of the first embodiment.

FIG. 10 is a diagram illustrating an example of a blur function of a target image of the first embodiment.

FIG. 17 is a diagram illustrating an example of a functional block of an image processing apparatus of a second embodiment.

FIG. 21 is a flowchart illustrating an example of a flow of a processing of the image processing apparatus of the second embodiment.

FIG. 22 is a diagram illustrating an example of a measuring tool to which the image processing apparatus of the first or second embodiment is applied.

FIG. 23 is a diagram illustrating an example of a monitor system to which the image processing apparatus of the first or second embodiment is applied.

DETAILED DESCRIPTION

Figure 4:
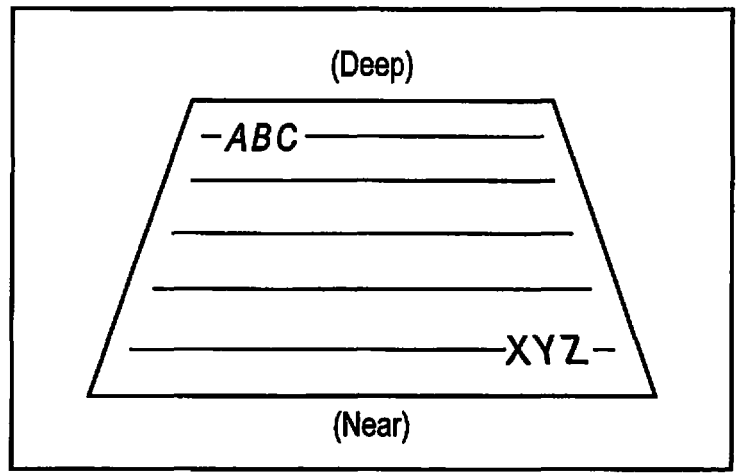
FIG. 4 is a diagram illustrating an example of a captured image for describing an OCR process of the processing system of the first embodiment.

In general, according to one embodiment, an image processing apparatus includes a memory and one or more processors. The one or more processors are electrically connected to the memory, and are configured to calculate blur correction information to make a blur of a first shape of an object approach a blur of a second shape of the object. The first shape of the object is contained in a first component image of one image. The second shape of the object is contained in a second component image of the one image. The one or more processors are further configured to calculate a distance between an imaging device and the object based on an image distance when the one image is captured and the blur correction information. The image distance is a distance from a lens up to an image forming surface of the object.

Embodiments will be described hereinafter with reference to the accompanying drawings.

First Embodiment

First, a first embodiment will be described.

FIG. 1 is a diagram illustrating an example of a functional block of an image processing apparatus 1 of the embodiment.

The image processing apparatus 1 acquires a distance from an imaging module capturing a captured image 51 up to an object and outputs the distance as depth information 52. While the details will be described below, the captured image 51 contains a plurality of color images (for example, R [red] image, G [green] image, and B [blue] image) in which the blurs are occurred in different shapes from each other, and the image processing apparatus 1 calculates blur correction information for correcting the shapes of blurs of the plurality of color images to be matched to each other and acquires the distance to the object. A blur is occurred in a case where a distance to the object and a focal distance are deviated. The size of a blur varies depending on a difference between the distance to the object and the focal distance. Therefore, in a case where a variable focus camera is used which can adjust the focal distance, the size of a blur varies depending on a distance from the imaging module (for example, a lens) up to an image forming surface of the object which changes according to the adjustment of the focal distance even when the same object at the same distance is captured. In other words, in a case where the variable focus camera is used, a relation between the blur correction information and the distance to the object changes depending on a distance from the lens to the image forming surface of the object. The image processing apparatus 1 is configured to acquire the distance to the object and output the distance as the depth information 52 even if the captured image 51 is captured by the variable focus camera, which will be described in detail.

As illustrated in FIG. 1, the image processing apparatus 1 includes a blur correction information calculator 11 and a depth information calculator 12. The blur correction information calculator 11 calculates a blur correction value which is used to correct the shape of blur of one image (the captured image 51), for example, one of two color images to be the shape of blur of the other color image, and outputs the calculated blur correction value as blur correction information 53. In the embodiment, for example, while the details will be described below, it is assumed that the one color image is occurred to have an asymmetric shape of blur, and the other color image is occurred to have a symmetric shape of blur. Further, a combination of the shapes of blurs is not limited by a lens aberration and a shape of a color filter (described below in detail), but the blur correction value may be obtained by a similar method as long as the combination of the shapes of blur is different. Hereinafter, the blur correction value will be called a convolution kernel.

On the other hand, the depth information calculator 12 calculates the distance to the object using the blur correction information 53 output from the blur correction information calculator 11, and an image distance 54 which is a distance from the lens up to the image forming surface of the object at the time of capturing the one image (the captured image 51) and is acquired from the variable focus camera for example, and outputs the depth information 52. In the embodiment, the image processing apparatus 1 is assumed that the image distance 54 can be acquired from the outside. Further, hereinafter, the focal distance, that is, the distance to the object at a focal position from the lens will be called an object distance with respect to the image distance.

The depth information calculator 12 includes an LUT (Look-up table) storage module 121, an LUT selector 122, and a depth converter 123.

The LUT storage module 121 has a plurality of LUTs 55 which indicate a relation between the blur correction value and the distance to the object. The relation between the blur correction value and the distance to the object varies depending on the image distance 54. The plurality of LUTs 55 are provided at every image distance 54 which is discrete within a range from a lower limit to an upper limit. Herein, the description will be given on an assumption that the LUT 55 is used, but the embodiment is not limited to the LUT 55.

For example, a relational expression (model formula) showing the relation between the blur correction value and the distance to the object may be used. In other words, any information may be used as long as the distance to the object can be derived from the blur correction value.

For example, the LUT selector 122 selects one LUT 55 among the plurality of LUTs 55 of the LUT storage module 121 based on the image distance 54 acquired from the variable focus camera. In a case where the variable focus camera can move the lens linearly instead of stepwise, it may be considered that there is no LUT 55 matched to the image distance 54. In such a case, the LUT selector 122 may select the LUT 55 at a distance closest to the image distance 54. Alternatively, for example, the LUT selector 122 may select the LUT 55 by generating a new LUT 55 from the LUTs 55 corresponding to two adjacent distances interposing the image distance 54. The embodiment is not limited to the LUTs 55 at the two distances, and new one LUT 55 may be generated from the LUTs 55 at three or more distances and be selected. This is also similar to the LUT selector 122 even in a case where the relation between the blur correction value and the distance to the object is expressed by a relational expression. More specifically, a relational expression of a distance closest to the image distance 54 may be selected, or one relational expression may be generated and selected from the relational expressions of two adjacent distances interposing the image distance 54 for example. In addition, one relational expression is generated and selected from the relational expressions of three or more distances. In a case where the LUT storage module 121 stores a relational expression (model formula) which indicates a relation between the blur correction value and the distance to the object and contains the image distance 54 as a parameter, the LUT selector 122 may generate a relational expression in which a value is substituted to the parameter based on the image distance 54. In this case, there is no need to provide a plurality of relational expressions within the range from the lower limit to the upper limit of the image distance 54, and only one relational expression may be enough.

The depth converter 123 acquires the distance to the object from the blur correction value using the LUT 55 selected by the LUT selector 122. In other words, the depth converter 123 coverts the blur correction information 53 of the blur correction value into the depth information 52 of the distance to the object. While the details will be described below, the depth information 52 contains data related to a distance which is calculated in units of pixel for example. For example, the depth information 52 is information of a map format in which data related to the distance is disposed in association with a pixel in the captured image 51, and a pixel value of each pixel is generated as an image indicating a distance.

In this way, the image processing apparatus 1 is configured to adaptively select one LUT 55 among the plurality of LUTs 55. Therefore, the distance to the object can be acquired even in a case where the captured image 51 is obtained by the variable focus camera in which the image distance 54 is changeable. Of course, the image processing apparatus 1 can acquire the distance to the object from the captured image 51 which is captured by the variable focus camera in which the image distance 54 is changeable even when one relational expression is adaptively selected among the plurality of relational expressions.

FIG. 2 is a diagram illustrating an example of a hardware configuration of the image processing apparatus 1. As illustrated in FIG. 2, the image processing apparatus 1 includes a CPU 101, a RAM 102, a nonvolatile memory 103, an input/output device 104, and a communication device 105. In addition, the image processing apparatus 1 includes a bus 106 which connects the CPU 101, the RAM 102, the nonvolatile memory 103, the input/output device 104, and the communication device 105.

The CPU 101 is a processor which loads a computer program stored in the nonvolatile memory 103 to the RAM 102 and executes the computer program, and realizes the respective processing modules of the image processing apparatus 1 including the blur correction information calculator 11 and the depth information calculator 12 illustrated in FIG. 1. Herein, the description will be given about an example in which the respective processing modules of the image processing apparatus 1 are realized by one CPU 101 (that is, single processor), but the respective processing modules of the image processing apparatus 1 may be realized by a plurality of processors. The respective processing modules of the image processing apparatus 1 may be realized by dedicated electronic circuitry. The RAM 102 is a storage media used as a main storage device, and the nonvolatile memory 103 is a storage media used as an auxiliary storage device.

The input/output device 104 is a module which performs inputting/outputting such as inputting an instruction from a user, inputting the captured image 51 and the image distance 54, or outputting the depth information 52. An instruction from the user may be input by an operation of a keyboard, a pointing device, or an operation button, or may be input by a touch operation on a touch screen display. The communication device 105 is a module which communicates with an external device through a network or communicates with a surrounding external device in a wireless manner. The inputting of the captured image 51, the inputting of the image distance 54, and the outputting of the depth information 52 may be performed by the communication device 105.

FIG. 3 is a diagram illustrating an example of a processing system 100 which is established by applying the image processing apparatus 1. Herein, the processing system 100 is assumed as an optical character recognition (OCR) system which takes an image such as a document and recognizes characters and symbols on the document to generate text data. In addition, herein, the processing system 100 is assumed to be established on a portable electronic device such as a tablet or a smart phone where a camera is mounted. More specifically, it is assumed that software (application program) is installed in the electronic device to operate the electronic device as the OCR system to realize the processing system 100 on the electronic device when the software is activated. In addition, hereinafter, the image processing apparatus 1 which is applied to the processing system 100 will be called an imaging processor 1.

Figure 5:
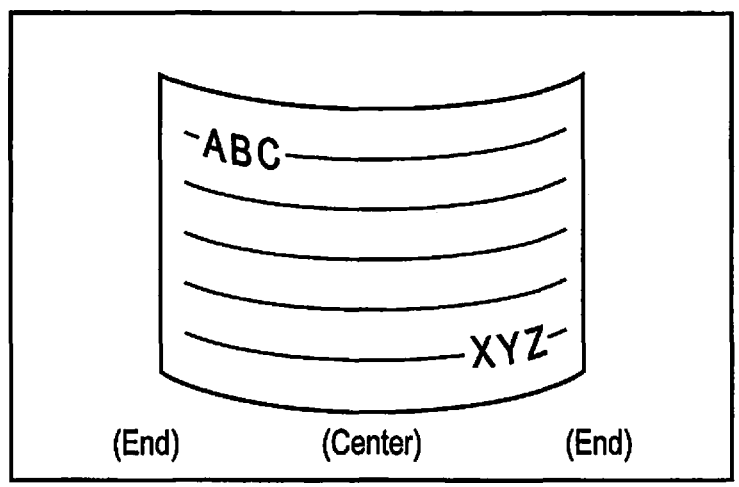
FIG. 5 is a diagram illustrating another example of the captured image for describing the OCR process of the processing system of the first embodiment.

The processing system 100 serving as the OCR system comprises a function of recognizing the characters and the symbols obtained after correcting the shape of the object (for example, a document) on the image. For example, in a case where a shadow of a user appears due to a positional relation between a lighting and the user if the document on a table is captured from the front side (right above), the document cannot but help capturing obliquely from the seat. As illustrated in FIG. 4, a portion on a back side is captured small, and a lower portion on a front side is captured large. In this case, the characters and the symbols on the documents are distorted as an image. In addition, for example, in a case where a notice is attached on a pillar, as illustrated in FIG. 5, the notice is captured in a state where a portion at the center (in the horizontal direction) is captured large while both ends are captured small. Even in this case, the characters and the symbols on the notice captured as an image are distorted.

When the characters and the symbols are recognized while being distorted, the accuracy is significantly lowered. In order to correct the shape of the object on the image to remove the distortion, the processing system 100 acquires the depth information 52 (the distance to the object) from the captured image 51. For example, in a case where the document is captured as illustrated in FIG. 4, or in a case where the notice is captured as illustrated in FIG. 5, the document or the notice can be corrected into an image as if being captured from the front side if distances (the depth information 52) to the respective regions of the document or the notice on the image (the captured image 51) can be acquired. Further, the characters and the symbols on the document or the notice can be recognized with accuracy without depending on a capturing direction of the document or the notice and the shape of the mounting surface.

As illustrated in FIG. 3, the processing system 100 includes the imaging processor 1, an imaging module 2, a graphical user interface (GUI) module 3, a storage module 4, and an OCR module 5. Herein, in order to help with explanation, the OCR module 5 is illustrated as being separate from the imaging processor 1, but the imaging processor 1 may also have the function of the OCR module 5. In other words, the OCR module 5 may be included in the imaging processor 1. In addition, as described above, the description herein has been given on an assumption that the processing system 100 is established on the electronic device such as a tablet and a smart phone. The processing system 100, however, may be established as a distributed system in which a plurality of electronic devices are connected through a network in cooperation with each other as well as a stand-alone system. In a case where the processing system is established as a distributed system, the processing system 100 may transfer data between the processing modules provided on different electronic devices through communication, or may transfer the data through an electronic device serving as a file server. In addition, the respective components illustrated in FIG. 2 as a hardware configuration of the image processing apparatus 1 may be shared in the entire processing system 100 in a case where the processing system 100 is established as a stand-alone system. For example, the imaging processor 1 and the OCR module 5 in FIG. 3 are realized by the CPU 101 in FIG. 2, the GUI module 3 in FIG. 3 corresponds to the input/output device 104 in FIG. 2, and the storage module 4 in FIG. 3 may be established in the nonvolatile memory 103 in FIG. 2.

The imaging module 2 is a module which generates the captured image 51 supplied to the imaging processor 1. Depending on the imaging module 2, the image and the distance image can be acquired by one capturing of a single imaging optical system. As illustrated in FIG. 3, the imaging module 2 includes a filter 110, a lens 120, an image sensor 130, an actuator 140, and a focus controller 150. Herein, the captured image 51 generated by the imaging module 2 will be described in detail together with the respective components of the imaging module 2. In FIG. 3, arrows from the filter 110 to the image sensor 130 indicate the paths of light, and the other arrows indicate the paths of electric signals.

The actuator 140 moves the lens 120 in a direction away from the image sensor 130 or a direction approaching to the image sensor 130 under the control of the focus controller 150. With the function of the actuator 140 and the focus controller 150, the imaging module 2 can adjust the focal distance. In other words, the imaging module 2 can adjust the image distance 54. Herein, the imaging processor 1 is assumed to acquire the image distance 54 from the focus controller 150 of the imaging module 2. Further, the embodiment is not limited to the configuration that the image distance 54 is acquired from the focus controller 150 of the imaging module 2, but the image distance may be acquired from any way. For example, the imaging module 2 adds the image distance 54 to the captured image 51 as attribute information, and the imaging processor 1 may acquire the image distance 54 added to the captured image 51 as the attribute information.

The image sensor 130 receives the light transmitting the filter 110 and the lens 120, and converts the received light into an electric signal (photoelectric conversion) to generate an image. As the image sensor 130, for example, a charge coupled device (CCD) or a complementary metal oxide semiconductor (CMOS) is used. The image sensor 130 includes, for example, an imaging element (a first sensor 131) which receives red (R) light, an imaging element (a second sensor 132) which receives green (G) light, and an imaging element (a third sensor 133) which receives blue (B) light. Each imaging element receives the corresponding wavelength bandwidth, and converts the received light into an electric signal. The electric signal is subjected to A/D conversion to generate a color image. Further, the R image, the G image, the B image can be respectively generated using the electric signals of red, green, and blue image elements. In other words, the color image, the R image, the G image, and the B image can be generated at the same time. In other words, the imaging module 2 can obtain the color image, the R image, the G image, and the B image by one capturing.

The filter 110 includes two or more color filter areas (herein, a first filter area 111 and a second filter area 112). Each of the color filter areas is formed asymmetrically with respect to an optical center of the imaging module 2. Part of the wavelength band of the light transmitted through one color filter area and part of the wavelength band of the light transmitted through another color filter area are overlapped for example. The wavelength band of the light transmitted through one color filter area may include the wavelength band of the light transmitted through the other color filter area for example.

FIG. 6 illustrates an exemplary configuration of the filter 110. The filter 110 is configured by the first filter area 111 and the second filter area 112 of two-color filter areas for example. The center of the filter 110 is matched with the optical center 113 of the imaging module 2. Each of the first filter area 111 and the second filter area 112 is asymmetrical to an optical center 113. In addition, for example, the filter areas 111 and 112 are not overlapped, and the entire filter area is configured by two filter areas 111 and 112. In the example illustrated in FIG. 6, the first filter area 111 and the second filter area 112 each are a semi-circular shape obtained by dividing the circular filter 110 by a line segment passing through the optical center 113. In addition, for example, the first filter area 111 is a yellow (Y) filter area, and the second filter area 112 is a cyan (C) filter area. Hereinafter, the description will be given on an assumption of using the filter 110 illustrated in FIG. 6.

For example, the filter 110 illustrated in FIG. 6 is disposed in an aperture portion of the camera, and thus a color-filtered aperture divided into two color parts is configured. The image sensor 130 generates an image based on the ray of light transmitted through the color-filtered aperture. The lens 120 may be disposed between the filter 110 and the image sensor 130 on an optical path of the light incident on the image sensor 130. The filter 110 may be disposed between the lens 120 and the image sensor 130 on an optical path of the light incident on the image sensor 130. In a case where there are provided a plurality of lens 120, the filter 110 may be disposed between two lens 120.

The light of the wavelength band corresponding to the second sensor 132 is transmitted through both the yellow first filter area 111 and the cyan second filter area 112. The light of the wavelength band corresponding to the first sensor 131 is transmitted through the yellow first filter area 111, but is not transmitted through the cyan second filter area 112. The light of the wavelength band corresponding to the third sensor 133 is transmitted through the cyan second filter area 112, but is not transmitted through the yellow first filter area 111.

It should be noted that the transmitting of the light of a certain wavelength band through the filter or the filter area means that the light of the wavelength band is transmitted through the filter or the filter area with a high transmission rate, and the attenuation (that is, a reduction of the amount of light) of the light of the wavelength band is extremely reduced by the filter or the filter area. In addition, the non-transmitting of the light of a certain wavelength band through the filter or the filter area means that the light is shielded by the filter and the filter area and, for example, the light of the wavelength band is transmitted through the filter or the filter area with a low transmission rate, and the attenuation of the light of the wavelength band is extremely increased by the filter and the filter area. For example, the filter or the filter area absorbs the light of a certain wavelength band to attenuate the light.

FIG. 7 is a diagram illustrating an example of transmittance characteristics of the first filter area 111 and the second filter area 112. As illustrated in FIG. 7, in a transmittance characteristic 151 of the yellow first filter area 111, the light of the wavelength band corresponding to the R image and the G image is transmitted at a high transmission rate, and the light of the wavelength band corresponding to the B image is nearly not transmitted. In addition, in a transmittance characteristic 152 of the cyan second filter area 112, the light of the wavelength band corresponding to the B image and the G image is transmitted at a high transmission rate, and the light of the wavelength band corresponding to the R image is nearly not transmitted.

Therefore, the light of the wavelength band corresponding to the R image is transmitted only through the yellow first filter area 111, and the light of the wavelength band corresponding to the B image is transmitted only through the cyan second filter area 112, and thus the shapes of blurs on the R image and the B image are changed according to a distance d to the object, and more specifically, according to a difference between the distance d and a focal distance df. In addition, since each of the filter areas 111 and 112 is asymmetrically formed with respect to the optical center, the shapes of blurs on the R image and the B image are different according to whether the object is on the front side or on the back side from the focal distance df. In other words, the shapes of blurs on the R image and the B image are unbalanced.

Figure 8:
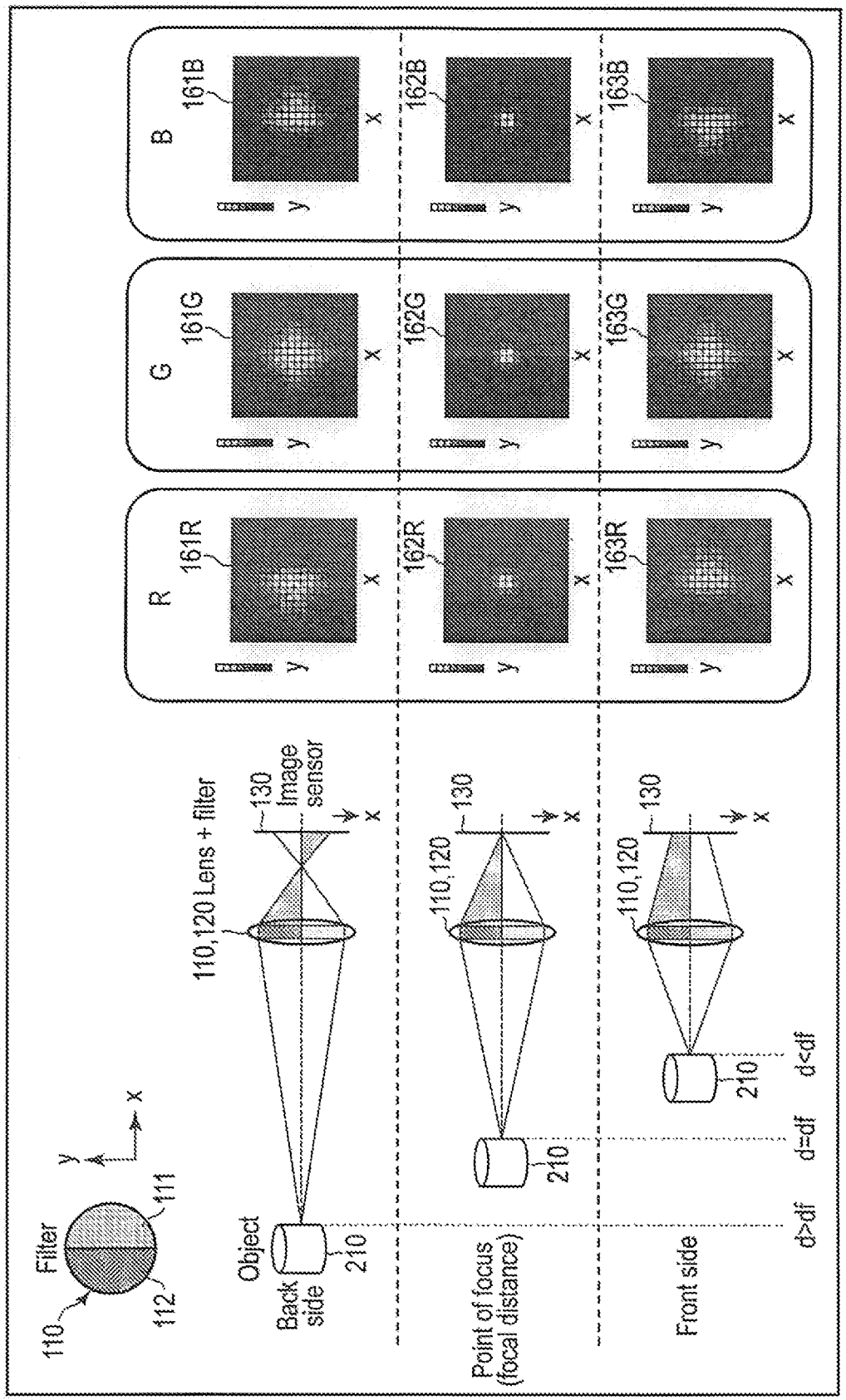
FIG. 8 is a diagram for describing variation of a ray of light by a color-filtered aperture of the first embodiment and a shape of a blur.

With reference to FIG. 8, the description will be given about variation of a ray of light and a shape of blur according to the color-filtered aperture where the filter 110 is disposed.

In a case where an object 210 is on the back side from the focal distance df (d>df), a blur is occurred in the image captured by the image sensor 130. A blur function (point spread function: PSF) indicating the shapes of blurs of the image is different in each of the R image, the G image, and the B image. For example, a blur function 161R of the R image shows a shape of blur which is shifted to the left side, a blur function 161G of the G image shows a shape of blur which is not shifted, and a blur function 161B of the B image shows a shape of blur which is shifted to the right side.

In addition, in a case where the object 210 is at the focal distance df (d=df), a blur is nearly not occurred in the image captured by the image sensor 130. The blur function indicating the shape of blur of the image is almost the same as the R image, the G image, and the B image. In other words, a blur function 162R of the R image, a blur function 162G of the G image, and a blur function 162B of the B image show shapes of blurs which are balanced.

In addition, in a case where the object 210 is on the front side from the focal distance df (d<df), a blur is occurred in the image captured by the image sensor 130. The blur function indicating the shape of blur of the image is different in each of the R image, the G image, and the B image. In other words, a blur function 103R of the R image shows a shape of blur which is shifted to the right side, a blur function 163G of the G image shows a shape of blur which is not shifted, and a blur function 163B of the B image shows a shape of blur which is shifted to the left side.

The imaging processor 1 of the processing system 100 calculates the distance to the object using such characteristics, and outputs the distance as the depth information 52. The blur correction information calculator 11 of the imaging processor 1 acquires, as a reference image, the G image having the shape of blur of which the blur function is balanced, and acquires, as a target image, one or both of the R image and the B image having the shape of blur of which the blur function is unbalanced. In other words, the captured image 51 includes the reference image and the target image.

The blur correction information calculator 11 obtains a convolution kernel in which a correlation to the reference image becomes higher when being added to the target image among a plurality of convolution kernels. The blur correction information calculator 11 outputs information related to the obtained convolution kernel as the blur correction information 53. The plurality of convolution kernels serve as functions to add different blurs to the target image. The depth information calculator 12 calculates the distance to the object based on a convolution kernel obtained by the blur correction information calculator 11. More specifically, the distance to the object is acquired using the above-described LUT 55. Herein, first, like a fixed focus camera, a basic distance calculation process of the blur correction information calculator 11 and the depth information calculator 12 will be described on the assumption that a distance from the lens 120 to the image sensor 130 (that is, the image distance 54) is a fixed value.

The blur correction information calculator 11 adds a different blur to the target image based on the acquired target image and the acquired reference image so as to generate a correction image which is obtained by correcting the shape of blur of the target image. Herein, the blur correction information calculator 11 generates the correction image obtained by correcting the shape of blur of the target image using the plurality of convolution kernels which are created on an assumption that the distance to the object is an arbitrary distance, and obtains a convolution kernel in which a correlation between the correction image and the reference image becomes higher. The depth information calculator 12 calculates the distance to the object based on the convolution, kernel.

Figure 9:
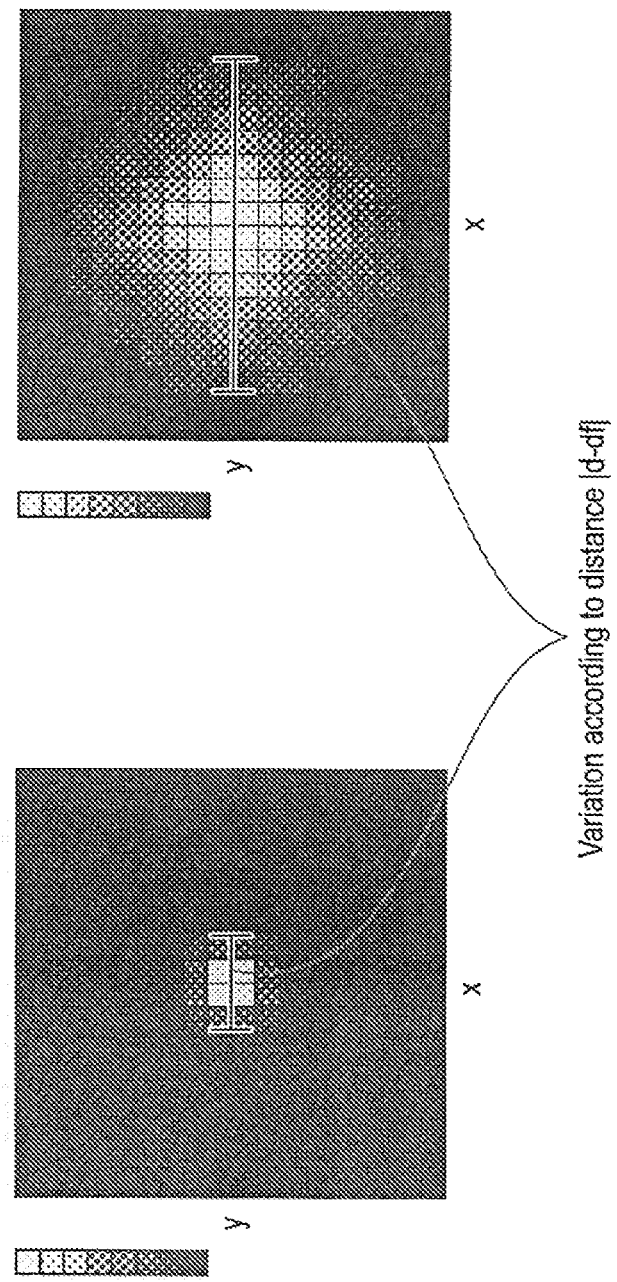
FIG. 9 is a diagram illustrating an example of a blur function of a reference image of the first embodiment.

The blur function of the captured image 51 is determined by an aperture shape of the imaging module 2, and a distance between a position of the object and a focusing position. FIG. 9 is a diagram illustrating an example of the blur function of the reference image. As illustrated in FIG. 9, the aperture shape where the wavelength band corresponding to the second sensor 132 is transmitted is a circular shape symmetrical about a point. Therefore, the shape of blur shown by the blur function is not changed before and after the focusing position, a blur width is changed according to a distance between the object and the focusing position. The blur function showing such a shape of blur can be expressed as a Gaussian function in which the blur width is changed according to a difference between a position of the object and a blur width. Further, the blur function may be expressed as a pill-box function in which a blur width is changed according to a distance between the position of the object and the focusing position. In addition, any functions may be used as long as a shape of blur is changed according to a distance between the position of the object and the focusing position.

FIG. 10 is a diagram illustrating an example of the blur function of the target image. Further, the center of each drawing (x0, y0) is (0, 0). As illustrated in FIG. 10, the blur function of the target image (for example, the R image) can be expressed as a Gaussian function in which the blur width is attenuated due to the light is attenuated in the first filter area 111 in x>0 in a case where the object is farther than the focusing position (d>df). In addition, in a case where the object is nearer than the focusing position (d<df), the blur function of the target image can be expressed as a Gaussian function in which the blur width is attenuated due to the light is attenuated in the first filter area 111 in x<0.

In addition, the plurality of convolution kernels to correct the shape of blur of the target image to be the shape of blur of the reference image can be obtained by analyzing the blur function of the reference image and the blur function of the target image.

Figure 11:
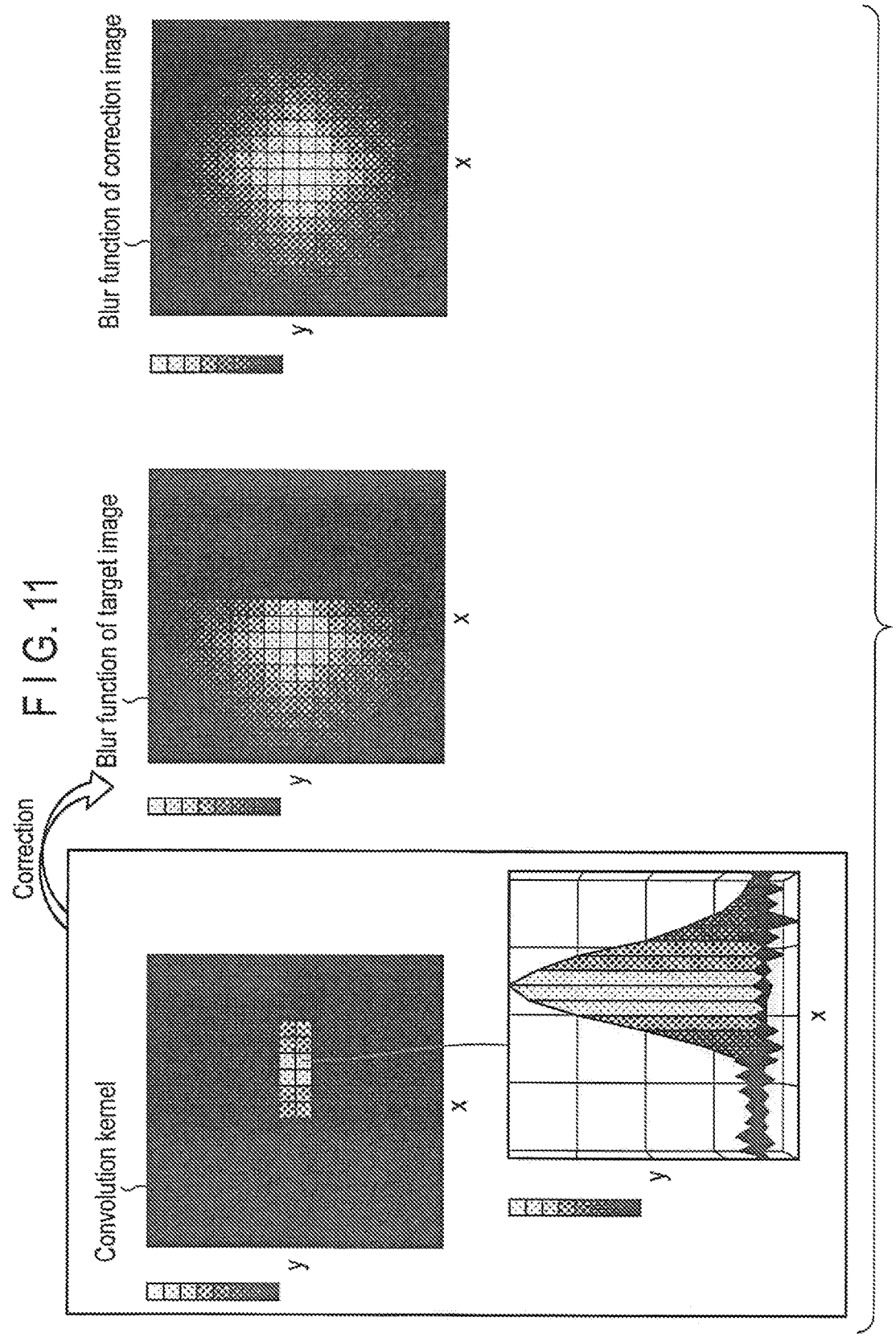
FIG. 11 is a diagram illustrating an example of blur correction information of the first embodiment.

FIG. 11 is a diagram illustrating an example of the convolution kernel. Further, the convolution kernel illustrated in FIG. 11 is a convolution kernel in a case where the filter 110 illustrated in FIG. 6 is used. As illustrated in FIG. 11, the convolution kernel is distributed on a straight line (near the straight line) which passes through a center point of the boundary line segment between the first filter area 111 and the second filter area 112, and is perpendicular to the boundary line segment. The distribution looks like a mountain as illustrated in FIG. 11 in which a peak point (a position on the straight line and a height) and a widening from the peak point are different at every assuming distance. The shape of blur of the target image can be corrected into various shapes of blurs obtained by assuming an arbitrary distance using the convolution kernel. In other words, it is possible to generate a correction image obtained by assuming an arbitrary distance.

The blur correction information calculator 11 obtains a convolution kernel with which the generated correction image and the reference image are closest or matched from the respective pixels of the captured image 51. A matching rate of the shape of blur may be obtained by calculating a correlation between the correction image and the reference image in a rectangular region of an arbitrary size with each pixel as a center. The matching rate of the shape of blur may be calculated using an existing similarity evaluation scheme. The depth information calculator 12 calculates the distance to the object of each pixel based on the convolution kernel obtained by the blur correction information calculator 11. More specifically, the distance to the object is acquired using the above-described (one) LUT 55 or a relational expression.

Further, it is possible to obtain a good quality image better than the captured image 51 by applying the convolution kernel obtained by the blur correction information calculator 11 to the captured image.

For example, an SSD (Sum of Squared Difference), an SAD (Sum of Absolute Difference), an NCC (Normalized Cross-Correlation), a ZNCC (Zero-mean Normalized Cross-Correlation), and a color alignment measure may be used as the existing similarity evaluation scheme. In this embodiment, the color alignment measure is used in which a characteristic is used such as color components of a natural image locally have a linear relationship. In the color alignment measure, an index indicating a correlation is calculated from a variation of a color distribution of a local area having a target pixel of the captured image as a center.

In this way, the blur correction information calculator 11 and the depth information calculator 12 correct the shape of blur of the target image according to the filter area using the convolution kernel on an assumption of a distance to generate the correction image, and obtain a distance at which the correlation between the generated correction image and the reference image is higher so as to calculate the distance to the object.

In addition, the depth information calculator 12 generates a distance map from the calculated distance, and outputs the distance map as the depth information 52. The distance map is generated, for example, as an image of which a pixel value of each pixel indicates a distance. For example, the distance map may be created such that a color having a long-wavelength color and a short-wavelength color are assigned in a direction from the front side of the focal position to the back side. In this way, in the distance map, information indicating the distance to the object is mapped to a corresponding image region, and the pixel value is used as information indicating the distance to the object. With the distance map generated as an image, a positional relation in a depth direction between a plurality of objects for example can be confirmed.

Figure 12:
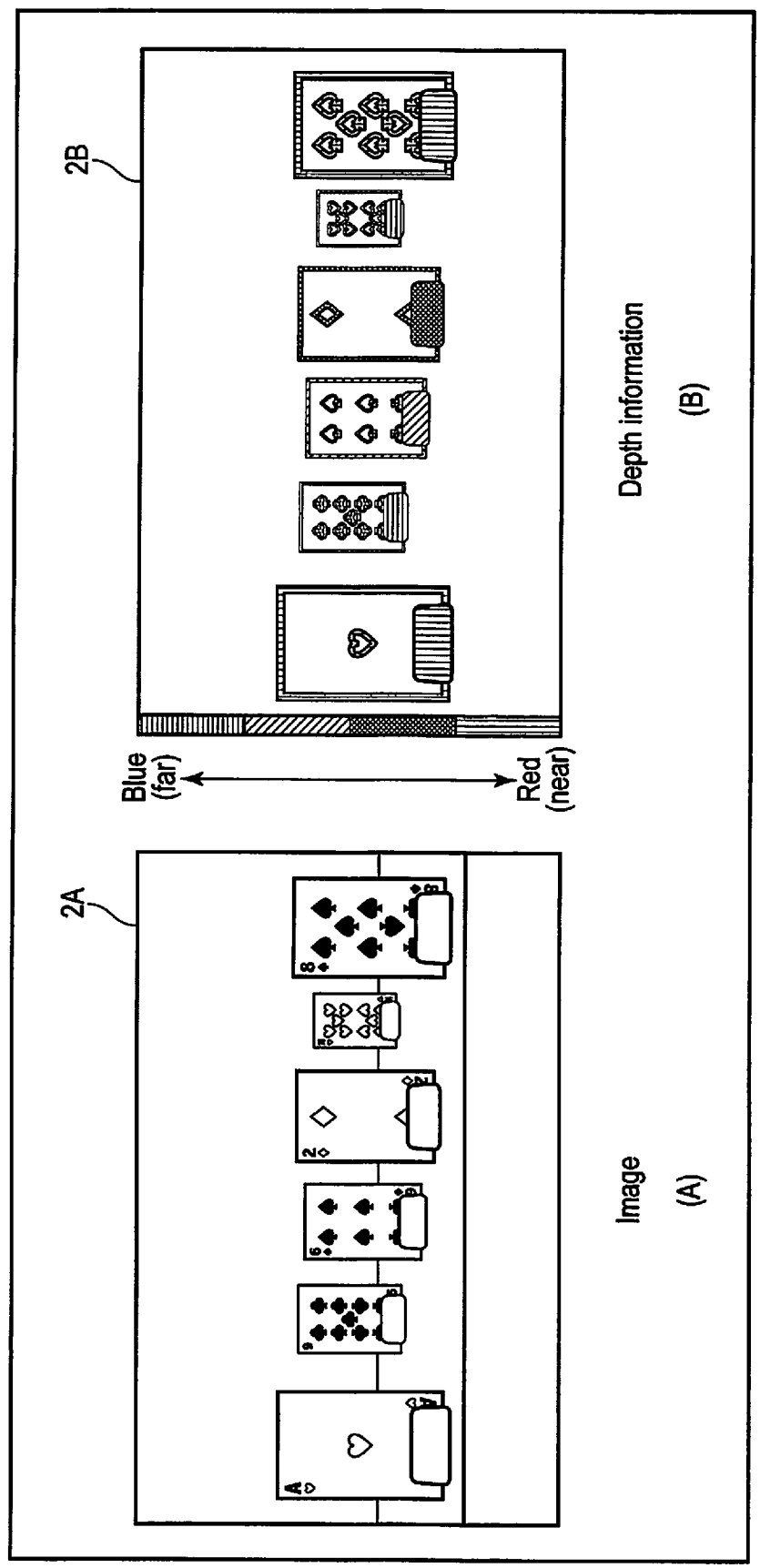
FIG. 12 is a diagram illustrating an example of the captured image and depth information of the first embodiment.

FIG. 12 is a diagram illustrating an example of the captured image 51 captured by the imaging module 2 and the distance map (the depth information 52) generated by the imaging processor 1.

In FIG. 12, (A) is a display example of the captured image 51, and (B) is a display example of the depth information 52. The pixel value of each pixel may be displayed with a color having a long wavelength as it is positioned on the front side from the focal position, and be displayed with a color having a short wavelength as it is positioned on the back side from the focal position. For example, an image is displayed such that a reddish color is disposed in the object positioned on the front side, and a purplish color is disposed in the object positioned on the back side.

Figure 13:
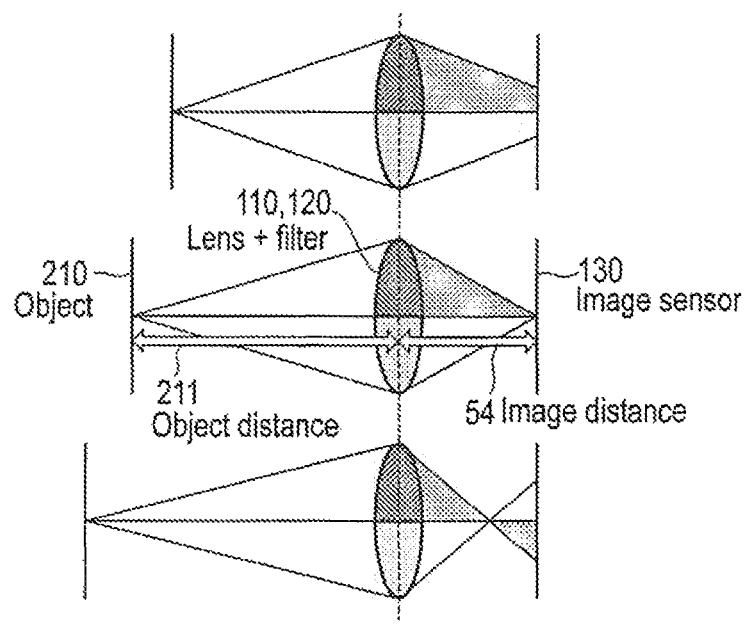
FIG. 13 is a diagram illustrating that a relation between a blur correction value and a distance town object corresponds to a one-to-one manner in the case of a fixed focus camera.
Figure 14:
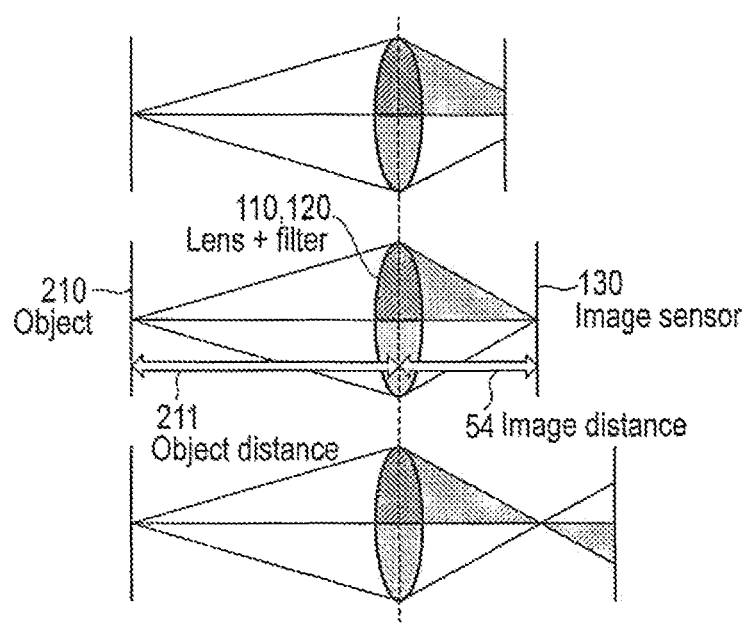
FIG. 14 is a diagram illustrating that a relation between the blur correction value and the distance to the object varies depending on an image distance in the case of a variable focus camera.

The above description has been given based on a distance calculation process of the blur correction information calculator 11 and the depth information calculator 12 on an assumption that the image distance 54 is a fixed value. Since the image distance 54 is fixed in the case of the fixed focus camera, for example, the blur correction value (the blur correction information 53) and the distance to the object 210 (the depth information 52) are in one-to-one relation as illustrated in FIG. 13. The upper portion of FIG. 13 illustrates the case of d>df, the middle portion illustrates the case of d=df, and the lower portion illustrates the case of d<df. More specifically, in a case where the image distance 54 (a distance from the lens 120 to a sensor surface of the image sensor 130) is fixed, an object distance 211 (a distance from the lens 120 to the object 210 in a state where the lens is focused on the object 210) is a fixed value. Therefore, a distance from the blur correction value to the object 210 can be uniquely deprived. On the other hand, since the image distance 54 is variable in the case of the variable focus camera, for example, a relation between the blur correction value and the distance to the object varies according to the image distance 54 as illustrated in FIG. 14. The upper portion of FIG. 14 illustrates the case of d>df, the middle portion illustrates the case of d=df, and the lower portion illustrates the case of d<df. More specifically, even if the distance from the lens 120 to the object 210 is the same, the blur correction value varies according to the image distance 54 which is a distance from the lens 120 to the sensor surface of the image sensor 130, and thus the distance to the object cannot be uniquely deprived from the blur correction value.

Figure 15:
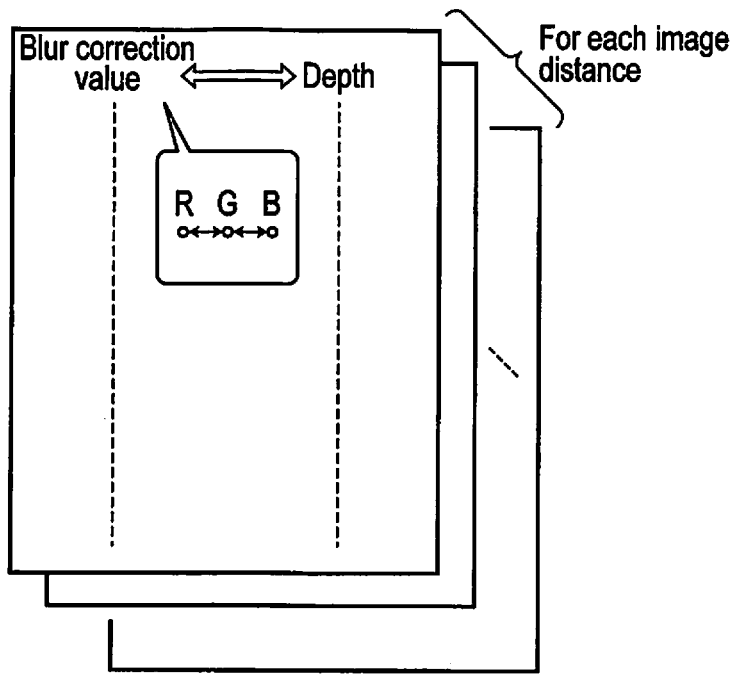
FIG. 15 is a diagram conceptually illustrating an example of an LUT of the first embodiment.

Therefore, the LUT storage module 121 of the depth information calculator 12 stores the plurality of LUTs 55 provided in each image distance 54 as described above, and the LUT selector 122 selects one LUT 55 among the plurality of LUTs 55 based on the image distance 54 which is acquired from the focus controller 150 of the imaging module 2 for example. FIG. 15 is a diagram conceptually illustrating an example of the LUT 55 which is stored in the LUT storage module 121. As illustrated in FIG. 15, the LUT 55 provided in each image distance 54 is created as a list table from which the distance to the object (the depth information 52) can be acquired using the blur correction value (the blur correction information 53) of the G image (the reference image) and one or both of the R image and the B image (the target image) as an index. As described above, the LUT selector 122 may generate one LUT 55 which should be selected originally from the plurality of LUTs 55 stored in the LUT storage module 121. The depth converter 123 acquires and outputs the depth information 52 corresponding to the blur correction information 53 using the LUT 55 selected by the LUT selector 122.

In this way, the imaging processor 1 can acquire the distance to the object and output the distance as the depth information 52 even in the case of the captured image 51 captured by the imaging module 2 (the variable focus camera). In other words, in the processing system 100, the imaging module 2 and the imaging processor 1 serve as a distance measuring apparatus which captures the object and measures the distance to the object.

Further, the imaging processor 1 outputs not only the depth information 52 but also one or both of the captured image 51 used for acquiring the depth information 52 and the correction image obtained by applying the convolution kernel obtained by the blur correction information calculator 11 to the captured image 51. Hereinafter, the captured image 51 may be referred to as a correction image. The captured image 51 and the depth information 52 are stored in the storage module 4 in correspondence with each other.

For example, the captured image 51 is continuously output from the imaging module 2, and the color image is supplied to the GUI module 3 through the imaging processor 1. For example, the software is activated to operate the electronic device as the OCR system, and thus the captured image 51 is output from the imaging module 2 until a release instruction (release operation) of the captured image 51 is performed. The GUI module 3 displays the color image in a display module 170 as a live view image. The user performs a framing operation including a focusing operation, and the release operation while watching the live view image. The focusing operation in the framing operation is informed from an operation module 160 to the focus controller 150, and the lens 120 is driven through the actuator 140. In other words, the image distance 54 is adjusted to adjust the object distance 211. In addition, the release operation is informed from the operation module 160 to the imaging processor 1, the captured image 51 output from the imaging module 2 at this timing is stored in the storage module 4 together with the depth information 52. Further, the imaging processor 1 may acquire the depth information 52 only at the time of the release operation, or may continuously perform. When the release operation is performed, the GUI module 3 switches an image displayed in the display module 170 into the captured image 51 released from the live view image in the release operation. For example, the image displayed in the display module 170 may be returned to the live view image after the operation of the OCR module 5 is completed which will be described below. In other words, the captured image 51 may be output again by the imaging module 2.

The OCR module 5 includes a shape corrector 180 which corrects a shape of the object (for example, document) on the captured image 51 (the color image) based on the depth information 52. The OCR module 5 displays a shape correction image containing the object of which the shape is corrected by the shape corrector 180 in the display module 170, or stores the shape correction image in the storage module 4. The shape corrector 180 further recognizes characters and symbols on the object of the captured image 51, and outputs text data (character information). The text data may be displayed in the display module 170, or may be stored in the storage module 4. The text data may be stored in the storage module 4 by an instruction of a user being displayed in the display module 170. A method of correcting the shape of the object using a distance and a method of recognizing characters and symbols on the object are not limited to a specific method, and various existing methods may be employed.

The shape correction image is an image obtained by correcting the shape of the object such as a document or a notice which is bent or deformed according to a capturing direction and a shape of the mounting surface. For example, an image obtained by capturing the object, which is placed on a flat surface, from the front surface. A distortion of the object contained in the shape correction image is smaller than that of the object contained in the captured image. The shape correction image is acquired using the depth information 52. The shape correction image may also be acquired using the LUT 55.

The processing system 100 may output the shape correction image from the OCR module 5. The shape correction image is transmitted to a device which can communicate with the processing system 100 in a wired or wireless manner for example.

In a case where the OCR module 5 is included in the imaging processor 1, the image processor 1 may output the shape correction image in addition to the depth information 52. Alternatively, the image processor 1 may output the shape correction image without outputting the depth information 52.

The operation of the OCR module 5 may start following the operation of the imaging processor 1 according to the release operation, or may be performed in response to an instruction from the user at timing different from the release operation. For example, the OCR module 5 may display a plurality of the captured images 51 stored in the storage module 4 in the display module 170 as options so as to correct and recognize the captured image 51 selected by the operation of the operation module 160 by the shape corrector 180.

In this way, the imaging processor 1 can acquires a distance to each region of the document or the notice on the image and thus the OCR module 5 corrects the shape of the document or the notice to the original shape. Therefore, for example, even in a case where a document is captured by the imaging module 2 (a variable focus camera) as illustrated in FIG. 4, or a case where a notice is captured as illustrated in FIG. 5, the processing system 100 can recognize the characters and the symbols on the document or the notice with a high degree of accuracy.

Figure 16:
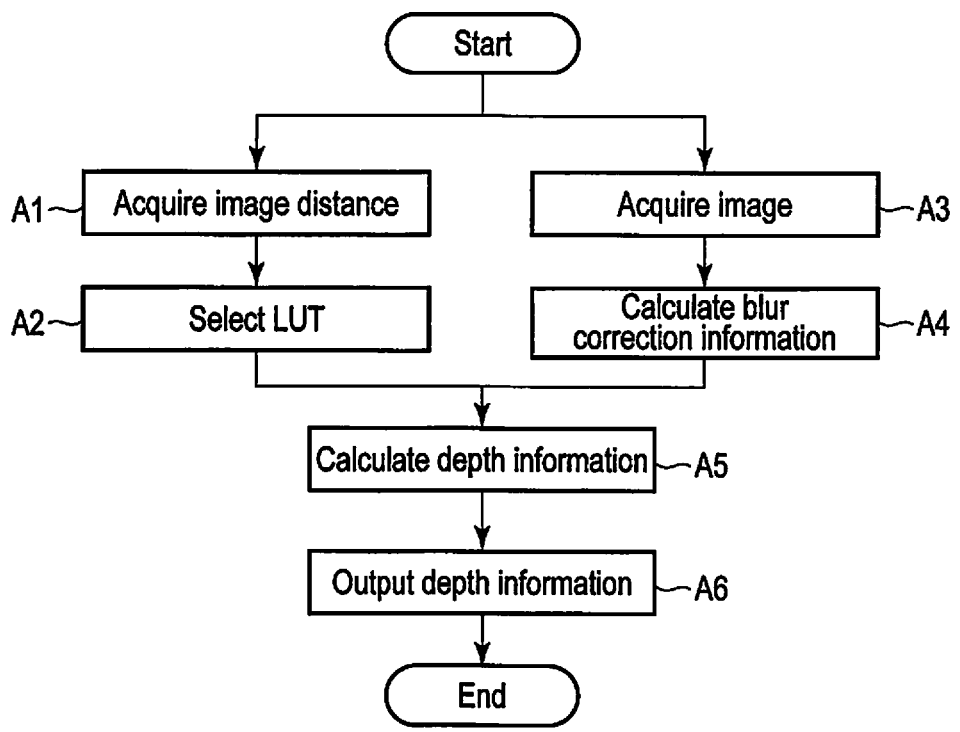
FIG. 16 is a flowchart illustrating an example of a flow of a processing of the image processing apparatus of the first embodiment.

FIG. 16 is a flowchart illustrating an example of a flow of a processing of the image processing apparatus (image processor) 1 of the embodiment.

The LUT selector 122 of the depth information calculator 12 acquires the image distance 54, for example, from the focus controller 150 of the imaging module 2 (Step A1), and selects one LUT 55 among the plurality of LUTs 55 stored in the LUT storage module 121 based on the image distance 54 (Step A2).

In addition, the blur correction information calculator 11 acquires the captured image 51, for example, from the image sensor 130 of the imaging module 2 (Step A3), and calculates the blur correction information 53 (Step A4). FIG. 16 illustrates that Step A1 and Step A2 can be performed in parallel with Step A3 and Step A4, but it is not necessarily to be performed in parallel, and either one may be performed after the other one. In addition, the captured image 51 and the image distance 54 may be not directly acquired from the imaging module 2, and may be acquired through the electronic device which serves as a file server as described above.

The depth converter 123 of the depth information calculator 12 calculates the depth information 52 based on the calculated blur correction information 53 and the selected LUT 55 (Step A5), and outputs the calculated depth information (Step A6).

As described above, the image processing apparatus 1 of the embodiment can acquire the distance to the object from the image captured by the variable focus camera.

Second Embodiment

Next, a second embodiment will be described. Further, the same configurations as those of the first embodiment in the following will be assigned with the same symbol, and the redundant description of the same configurations will be omitted.

FIG. 17 is a diagram illustrating an example of a functional block of an image processing apparatus 1-2 of the embodiment.

The image processing apparatus 1-2 of the embodiment also acquires a distance to an object from a captured image 51 (which is captured by a variable focus camera) similarly to the image processing apparatus of the first embodiment 1, and outputs the distance as depth information 52. The image processing apparatus 1-2 of the embodiment is different from the image processing apparatus of the first embodiment 1 in that the image processing apparatus 1-2 of the embodiment cannot acquire an image distance 54 from the outside. Therefore, the image processing apparatus 1-2 of the embodiment further includes a shape model storage module 13, a shape model selector 14, a three-dimensional shape calculator 15, and a comparator 16 in order to internally acquire the image distance 54. These processing modules may be realized by one or a plurality of processors, or may be realized by dedicated electronic circuitry.

The shape model storage module 13 stores a plurality of shape models 56 such as a shape model indicating a flat surface or a shape model indicating a curved surface. The shape model selector 14 selects one shape model 56 from among the plurality of shape models 56 which are stored in the shape model storage module 13. The selection of the shape model 56 by the shape model selector 14 may be performed based on an instruction of a user, or may be performed by recognizing the object of the captured image 51 and based on the recognition result. In other words, the image processing apparatus 1-2 may further include an object recognition module. The object recognition module may be provided in the shape model selector 14, or may be provided in a place different from the shape model selector 14. A method of recognizing the object is not limited to a specific method, and various existing methods may be employed. For example, it is assumed that in a case where a document on a table (on a flat surface) is captured as illustrated in FIG. 4, the shape model indicating a flat surface is selected, and in a case where a notice attached on a pole (a curved surface) is captured as illustrated in FIG. 5, the shape model indicating a curved surface is selected.

The three-dimensional shape calculator 15 calculates a three-dimensional shape 57 of the object based on the depth information 52 calculated by a depth information calculator 12 and the image distance 54. In this embodiment, since it is assumed that the image distance 54 cannot be acquired, the three-dimensional shape calculator 15 first calculates the three-dimensional shape 57 of the object using a temporary image distance 54 (for example, a predetermined value). As described in the first embodiment, the depth information calculator 12 calculates the depth information 52 using an LUT 55 corresponding to the image distance 54. Then, the depth information calculator 12 first calculates the depth information 52 using the temporary image distance 54.

Figure 18:
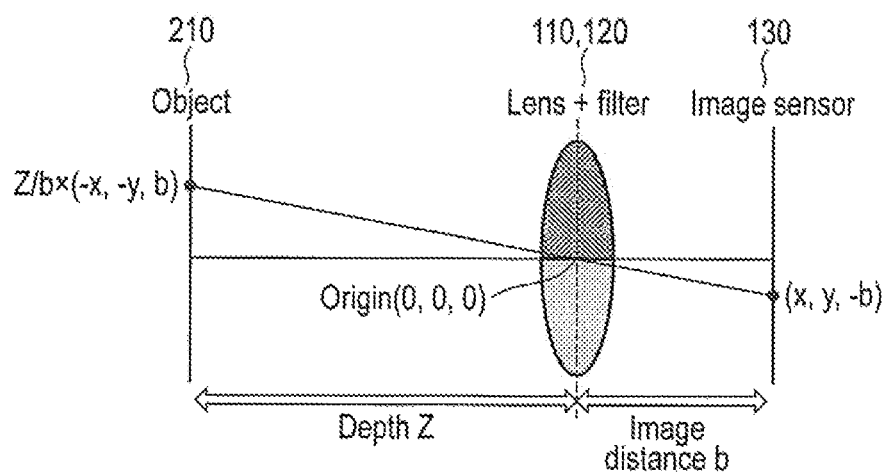
FIG. 18 is a diagram for describing a principle of calculating a three-dimensional shape of the object in the image processing apparatus of the second embodiment.

For example, as illustrated in FIG. 18, when the center of a lens 120 is set to (0, 0, 0), a distance (depth) from the lens 120 to an object 210 is set to Z, the image distance 54 from the lens 120 to an image sensor 130 is set to b, and each position of a sensor surface of the image sensor 130 is set to (x, y, −b), the three-dimensional shape 57 can be obtained by calculating Z/b×(−x, −y, b).

Figure 19:
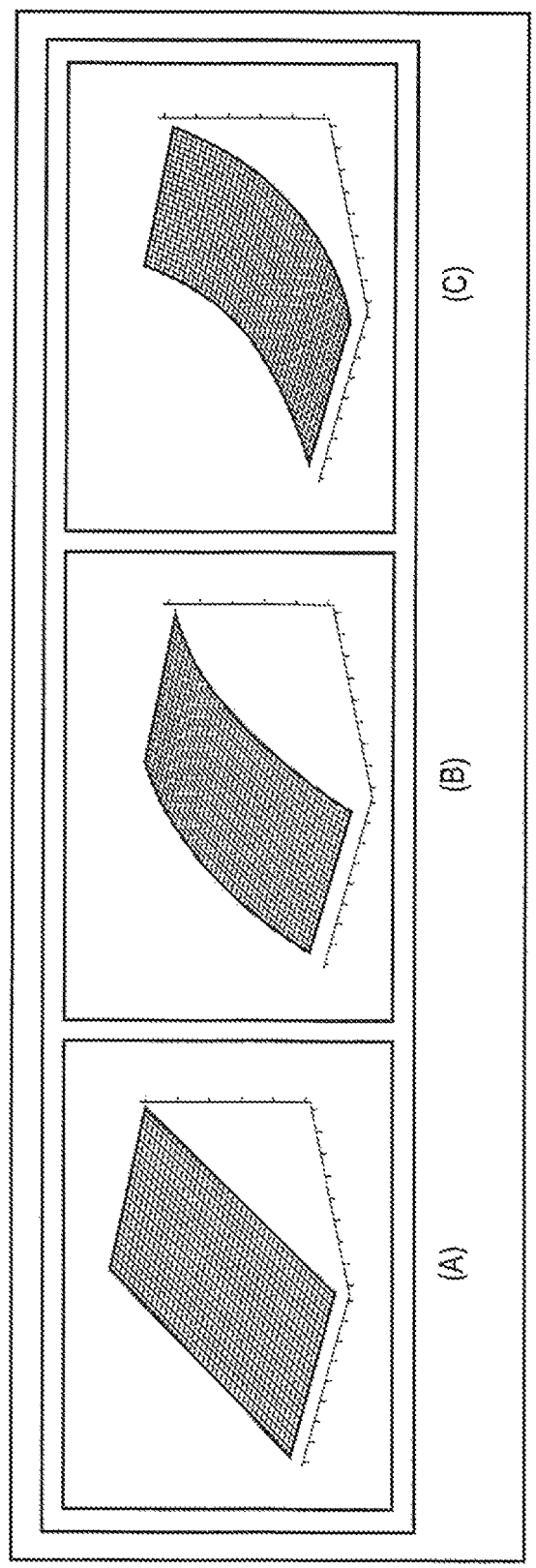
FIG. 19 is a diagram illustrating examples of the three-dimensional shape which are calculated by the image processing apparatus of the second embodiment.

The comparator 16 compares the shape model 56 selected by the shape model selector 14 with the three-dimensional shape 57 calculated by the three-dimensional shape calculator 15, and calculates a matching degree to the shape model 56 of the three-dimensional shape 57. In other words, calculating the matching degree is to obtain a correlation, to perform matching, or to obtain a similarity. FIG. 19 illustrates examples of the three-dimensional shape 57 which is calculated by the three-dimensional shape calculator 15. In FIG. 19, (A) to (C) illustrate the three-dimensional shapes 57 in a case where the depth information calculator 12 calculates the depth information 52 using different image distances 54, and the three-dimensional shape calculator 15 calculates the three-dimensional shapes 57. For example, in a case where the shape model 56 indicating a flat surface is selected by the shape model selector 14, it is determined that the image distance 54 used in calculating the three-dimensional shape 57 of (A) which most seems to be flat is appropriate compared to the shape model 56 indicating the flat surface, and it is determined that the depth information 52 used in the same calculation is an appropriate value. A method of calculating the matching degree to the shape model 56 of the three-dimensional shape 57 is not limited to a specific method, and various existing methods may be employed. For example, the same method as the method of obtaining the convolution kernel may be employed.

In a case where the calculated matching degree is larger than the threshold or equal to or more than the threshold, the comparator 16 determines that the image distance 54 used in the depth information calculator 12 and the three-dimensional shape calculator 15 is appropriate, and outputs the depth information 52 calculated by the depth information calculator 12. On the other hand, in a case where the calculated matching degree is equal to or less than the threshold or less than the threshold, the comparator 16 determines that the image distance 54 used in the depth information calculator 12 and the three-dimensional shape calculator 15 is not an appropriate value. In this case, the comparator 16 does not output the depth information 52, but calculates the image distance 54 to be used next based on an algorithm such as a gradient method to search a solution of an optimized problem for example, and outputs the image distance to the depth information calculator 12 and the three-dimensional shape calculator 15.

When the image distance 54 is output from the comparator 16, the depth information calculator 12 performs the calculation of the depth information 52 again including the selection of the LUT 55 using the image distance 54. Next, the three-dimensional shape calculator 15 performs the calculation of the three-dimensional shape 57 again using the image distance 54. The comparator 16 compares the shape model 56 selected by the shape model selector 14 with the three-dimensional shape 57 newly calculated by the three-dimensional shape calculator 15, and calculates the matching degree to the shape model 56 of the three-dimensional shape 57 again. When the calculated matching degree is larger than the threshold or equal to or more than the threshold, the depth information 52 is output. When the calculated matching degree is equal to or less than the threshold or less than the threshold, the image distance 54 to be used next is further calculated, and output to the depth information calculator 12 and the three-dimensional shape calculator 15. The image distance 54 to be used next may be selected in an order from a lower limit to an upper limit of the image distance 54 for example. For example, the matching degree between the three-dimensional shape 57 calculated based on the image distance 54 and the shape model 56 is repeatedly calculated using the plurality of image distances 54 until the matching degree is greater than the threshold or equal to or more than the threshold.

In other words, the image processing apparatus 1-2 of the embodiment estimates the image distance 54 (or a distance to the object) at the time of capturing the captured image 51 on an assumption that the shape of the object is a shape shown by the shape model 56 selected by the user for example.

Figure 20:
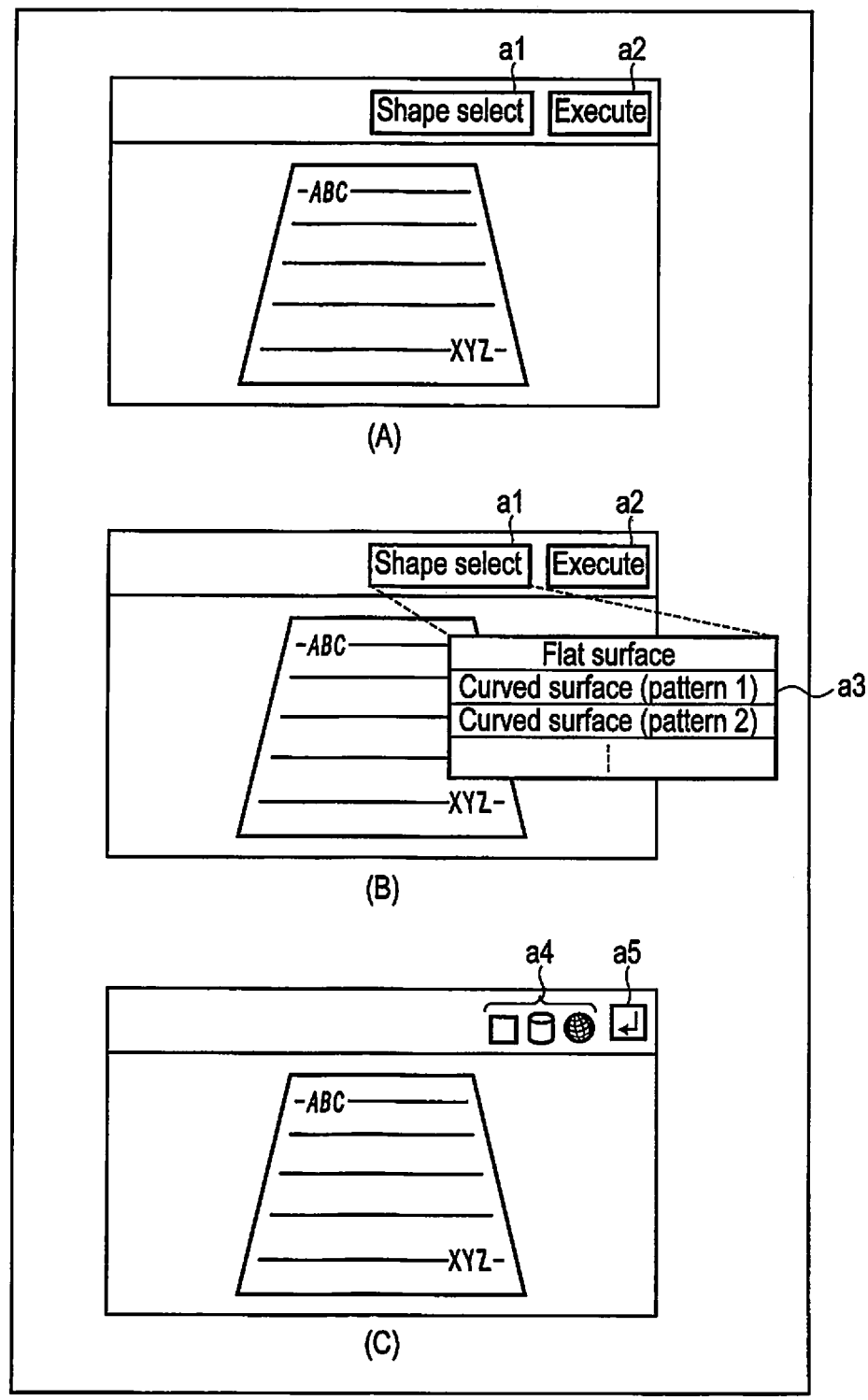
FIG. 20 is a diagram illustrating an example of a select screen of a shape model displayed by a processing system of the second embodiment.

FIG. 20 is a diagram illustrating an example of a select screen of the shape model 56 displayed in a display module 170 through the GUI module 3 by the shape model selector 14 in a case where the shape model selector 14 selects the shape model 56 based on an instruction of user.

Herein, it is assumed that an OCR module 5 starts operating continuously to the operation of an imaging processor 1 according to a release operation. When the captured image 51 is acquired by the release operation, an image displayed in the display module 170 is switched from a live view image to the select screen of the shape model 56. As illustrated in (A) of FIG. 20, the captured image 51 acquired by the release operation at that time is displayed on the select screen of the shape model 56, and a menu button a1 to open a list of the shape mode 56 and an execute button a2 to execute a recognition are displayed. When the menu button a1 is operated, as illustrated in (B) of FIG. 20, the plurality of shape models 56 is displayed as options (list a3). The user selects a target shape model 56 from the list a3 and operates the execute button a2, and thus a process suitable to the shape of the object of the captured image 51 can be performed. As a curved shape model, various patterns such as a cylinder shape and a spherical shape may be considered.

Further, in a case where the menu button a1 is not operated, and the execute button a2 is operated, for example, the shape model 56 set as an initial value in advance may be used, or the previously selected shape model 56 may be used. In addition, the plurality of shape models 56 is not necessarily indicated as the list a3 which is displayed according to an operation of the menu button a1 but, for example, may be indicated as an icon group a4 which shows any one of the shape models 56 as illustrated in (C) of FIG. 20. In this case, the execute button a2 may also be indicated as an icon (a5).

Alternatively, for example, the plurality of shape models may be displayed next to the captured image. The plurality of shape models are displayed side by side, and one shape model may be selected when the user touches that one. The plurality of shape models may be displayed sequentially by a scroll operation of the user for example, and one shape model may be selected when the user touches that one.

FIG. 21 is a flowchart illustrating an example of a flow of a processing of the image processing apparatus (image processor) 1-2 of the embodiment.

The shape model selector 14 selects one shape model 56 from among the plurality of shape models 56 stored in the shape model storage module 13 (Step B1).

In addition, a blur correction information calculator 11 acquires the captured image 51, for example, from the image sensor 130 of an imaging module 2 (Step B2), and calculates blur correction information 53 (Step B3). FIG. 21 illustrates that Step B1 can be performed in parallel with Step B2 and Step B3, but it is not necessarily to be performed in parallel, and either one may be performed after the other one. In addition, it is not necessary that the captured image 51 is directly acquired from the imaging module 2, and may be acquired through an electronic device which serves as a file server as described above.

The depth information calculator 12 calculates the depth information 52 using the calculated blur correction information 53 and a temporary image distance 54 such as a predetermined value (Step B4). When the depth information 52 is calculated by the depth information calculator 12 in Step B4, the LUT 55 is selected based on the temporary image distance 54 described in the first embodiment.

The three-dimensional shape calculator 15 calculates the three-dimensional shape 57 using the calculated depth information 52 and the temporary image distance 54 (Step B5). The comparator 16 compares the selected shape model 56 and the calculated three-dimensional shape 57, and calculates the matching degree to the shape model 56 of the three-dimensional shape 57 (Step B6). When the matching degree between the shape model 56 and the three-dimensional shape 57 is equal to or less than the threshold or less than the threshold (Step B6: NO), the comparator 16 calculates the image distance 54 to be used next, and outputs the image distance to the depth information calculator 12 and the three-dimensional shape calculator 15. Therefore, the process returns to Step B4. More specifically, the depth information calculator 12 calculates the depth information 52 again using the image distance 54 received from the comparator 16 instead of the temporary image distance 54, and the three-dimensional shape calculator 15 also calculates the three-dimensional shape 57 again using the recalculated depth information 52 and the image distance 54 received from the comparator 16 similarly.

On the other hand, when the matching degree between the shape model 56 and the three-dimensional shape 57 is larger than the threshold or equal to or more than the threshold (Step B6: YES), the comparator 16 considers that the image distance 54 used in calculating the depth information 52 is an appropriate value and outputs the depth information 52 (Step B7).

As described above, the image processing apparatus 1 of the embodiment can acquire the distance to the object from the image captured by the variable focus camera.

(Applications)

Next, applications of the image processing apparatus 1 of the first embodiment or the image processing apparatus 1-2 of the second embodiment will be described.

In the first embodiment and the second embodiment, it is assumed that the image processing apparatuses 1 and 1-2 are applied to the processing systems 100 and 100-2 which are OCR systems. The image processing apparatuses 1 and 1-2 are not limited to the processing system, and may be applied to various systems.

For example, the image processing apparatuses 1 and 1-2 may be realized as a measuring tool which is one of software installed in a tablet or a smart phone where a camera is mounted. For example, in a case where the user wants to know a size of a product on a showcase in a store, the user can acquire the size of the product by capturing the produce even though having no measure.

The image processing apparatuses 1 and 1-2 acquire a distance to an object in units of pixels. In addition, the image processing apparatuses 1 and 1-2 acquire an image distance at the time of capturing, and acquire a focal distance at the time of capturing. If the focal distance at the time of capturing is already known, a ratio of a length of the object on the image and a length of an actual object can be obtained from a ratio of a distance from an optical center to the center of the image and a distance from the optical center to the object. Therefore, the size of the actual object can be obtained by projecting (mapping) the respective pixels on an actual space (three-dimensional space).

For example, it is assumed a case where the user wants to measure various sizes of chairs displayed in a furniture store. In this case, first, the size of the image of the chair is captured by the camera of a tablet or a smart phone as illustrated in FIG. 22 after the measuring tool is activated. The measuring tool displays the image on a touch screen display of the tablet of the smart phone. In addition, the measuring tool projects the respective pixels of the image on a three-dimensional space based on the depth information 52.

In a case where the user wants to measure a width of the back of the chair, the user performs a touch operation on the touch screen display to touch one end (b1) in the horizontal direction of the back and then touch the other end (b2). When two points on the image are designated, the measuring tool acquires an actual distance between two designated points using coordinates on the three-dimensional space of the two pixels projected on the three-dimensional space and, for example, the size is displayed on the touch screen display of the smart phone to be overlapped with the image (b3).

In this way, the user can acquire the size only by capturing the size-measuring target object. Since a correct size is acquired even if the focal distance is changed, the user may focus on and capture the size-measuring target object similarly to a normal capturing. A distance to be measured in a case where two points are designated on the image is not limited only to a linear distance between two points. For example, in a case where two points are designated on an outer curved surface of the object, the linear distance can also be acquired, and an outer peripheral distance can also be acquired along the outer curved surface. The measuring tool may have a first mode to measure a linear distance between two points and a second mode to measure an outer peripheral distance between two points, and may acquire and display any one of the linear distance and the outer peripheral distance based on a user's selected mode. In addition, the measuring tool may acquire and display both of the linear distance and the outer peripheral distance, and may have a third mode to measure the linear distance and the outer peripheral distance between two points. When the third mode is set, the measuring tool may acquire and display both of the linear distance and the outer peripheral distance.

In addition, for example, the image processing apparatuses 1 and 1-2 may be applied to a monitor system to monitor pedestrians on passages in a commercial facility. FIG. 23 is a diagram illustrating an example of a monitor image in a case where the image processing apparatuses 1 and 1-2 are applied to the monitor system.

Herein, it is assumed that pedestrians (c21, c22, and c23) are within a capture range (oi1) of the monitor image, and the monitor image is displayed with heights (c31, c32, and c33) of the respective pedestrians as illustrated in FIG. 23. As for obtaining a size of the object, for example, in a case where a guard has found a suspicious person in the monitor image, the guard can immediately obtain a height which is one of valid information showing characteristics of that person. Not only the height, for example, a size of a carrying article can also be obtained.

It is assumed that a framing operation is performed including a focusing in order to trace a pedestrian c23 among these three pedestrians, and the capture range of the monitor image is switched from a range indicated with symbol c11 to a range indicated with symbol c12. In this way, even in a case where the focal distance varies, the size of the object can be appropriately obtained.

In addition, the image processing apparatuses 1 and 1-2 can be applied to a drive support system which supports a driving and an operation of a moving body such as a vehicle.

Figure 24:
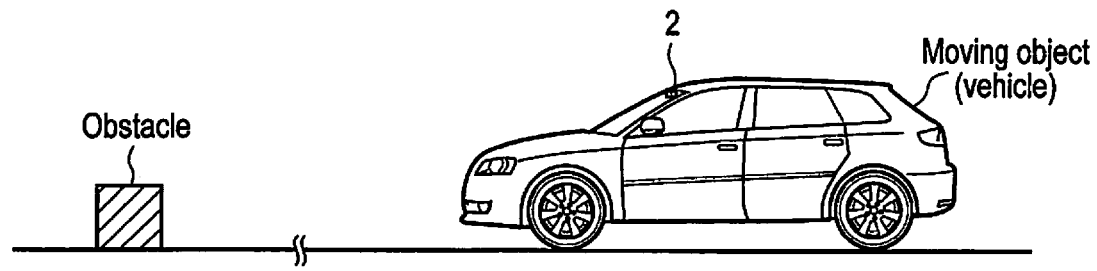
FIG. 24 is a diagram illustrating an example of a drive support system to which the image processing apparatus of the first or second embodiment is applied.

For example, the moving body is a vehicle, and an imaging module 2 is mounted to capture the front in an advancing direction as illustrated in FIG. 24. In addition, herein, it is assumed that there is an obstacle in the advancing direction of the vehicle.

In such a case, for example, even in a case where the focal distance varies in order to focus the obstacle from a state where the obstacle is in a distance place to a state where the obstacle is in a near place, the size of the object can be appropriately obtained. For example, in a case where the obstacle is a bump, it is determined whether the vehicle can go over the bump, and the determination result can be presented to a driver.

In addition, the image processing apparatuses 1 and 1-2 can be applied to, for example, an automatic door system.

Figure 25:
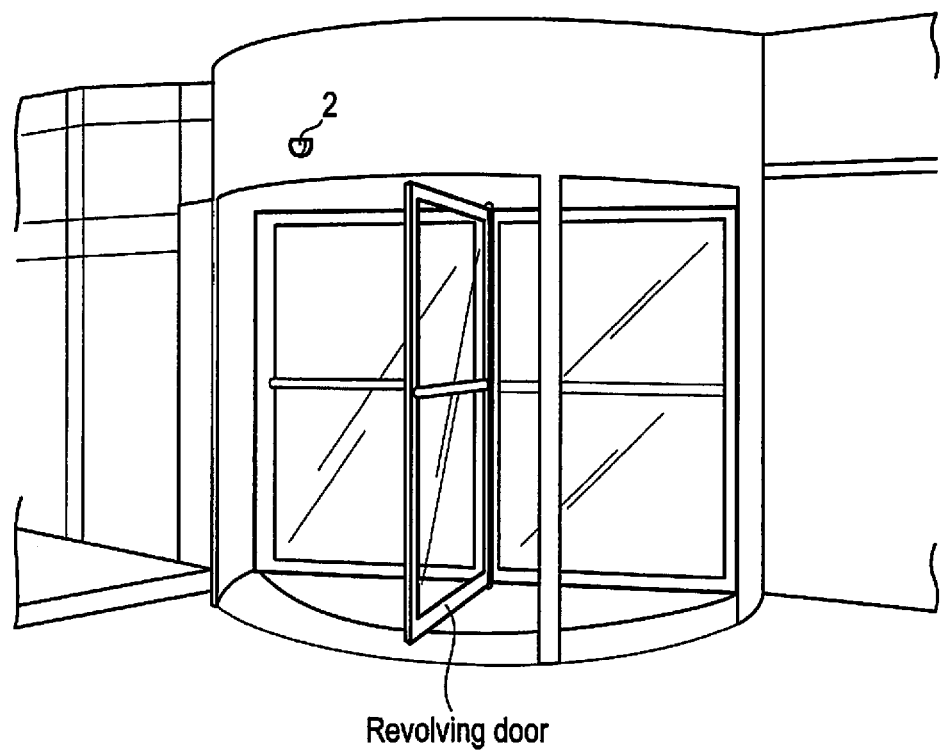
FIG. 25 is a diagram illustrating an example of an automatic door system to which the image processing apparatus of the first or second embodiment is applied.

For example, an automatic door in which a rotation door keeps rotating at a constant speed is assumed as illustrated in FIG. 25. In the case of the rotation door, a passer may hardly know about how big size can be passed. Therefore, a size of a passer's luggage (object) is acquired from an image captured by the imaging module 2. In a case where the size exceeds the size allowable to pass the rotation door, a warning voice may be output from an audio output unit which is provided in the rotation door. Since a distance to the object may be continuously obtained, the size is acquired and determined whether it can be passed only in a case where the object is coming toward the rotation door. Therefore, even when an object exceeding the allowable size traverses in front of the rotation door, it is possible to prevent that the warning voice is erroneously output.

Figure 26:
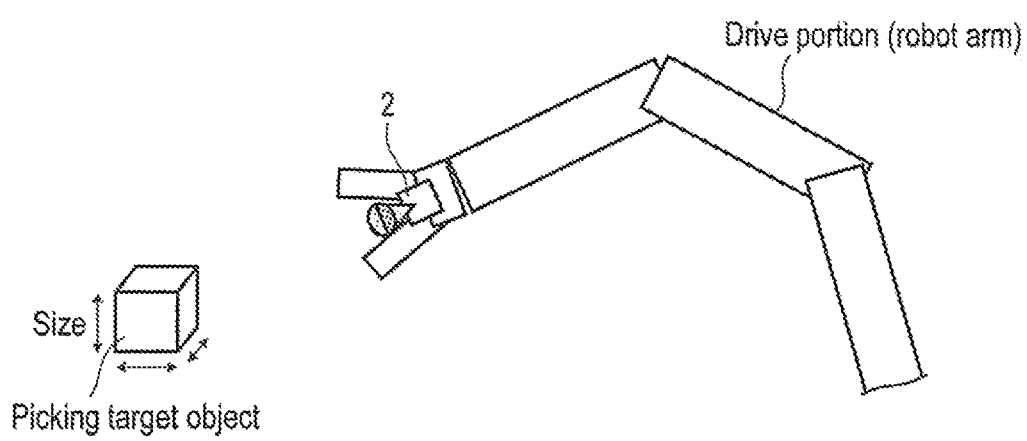
FIG. 26 is a diagram illustrating an example of a robot to which the image processing apparatus of the first or second embodiment is applied.

In addition, the image processing apparatuses 1 and 1-2 can be applied to a robot for example. Herein, the robot is assumed which includes a robot arm (drive portion) to pick up objects which are transferred on a conveyance line as illustrated in FIG. 26. In addition, the imaging module 2 is assumed to be mounted at the end portion of the robot arm.

In such a case, for example, when a picking target appears on an image, the size of the picking target can be appropriately obtained even in a case where the focal distance varies in order to focus on the picking target until the robot arm approaches the picking target and picks it up based on a position on the image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
 a memory; and
 one or more processors electrically connected to the memory and configured to
  calculate blur correction information to make a blur of a first shape of an object approach a blur of a second shape of the object, the first shape of the object being contained in a first component image of one image, the second shape of the object being contained in a second component image of the one image;
  select one shape model from among two or more shape models;
  select one temporary image distance from among two or more temporary image distances, an image distance being a distance from a lens up to an image forming surface of the object, the image distance being variable; and
  calculate a distance between an imaging device and the object based on the blur correction information and the selected image distance at which a three-dimensional shape of the object obtained based on the distance between the imaging device and the object has a correlation to the selected shape model compared to the other shape model.

2. The image processing apparatus of claim 1, wherein the two or more shape models include at least one of a model formula indicating a flat surface and a model formula indicating a curved surface.

3. The image processing apparatus of claim 1, wherein the one or more processors are configured to select the one shape model based on an instruction of a user.

4. The image processing apparatus of claim 1, wherein the one or more processors are configured to:
 recognize the object; and
 select the one shape model based on the result of the recognition.

5. The image processing apparatus of claim 1, wherein the one or more processors are configured to output the distance between the imaging device and the object in a case where a matching degree between the three-dimensional shape and the selected shape model is larger than a threshold.

6. The image processing apparatus of claim 1, wherein the one or more processors are configured to change the image distance and calculate the distance between the imaging device and the object in a case where a matching degree between the three-dimensional shape and the selected shape model is less than a threshold.

7. The image processing apparatus of claim 1, further comprising a storage device which stores a table or a relational expression indicating a relation among the image distance, the blur correction information, and a distance between the imaging device and the object; and the one or more processors are configured to calculate a distance between the imaging device and the object using the table or the relational expression.

8. The image processing apparatus of claim 7, wherein the one or more processors are configured to generate, using a first table or a first relational expression and a second table or a second relational expression, a third table or a third relational expression.

9. A distance measuring apparatus comprising:

the image processing apparatus of claim 1;

the imaging device; and a controller configured to adjust the image distance of the imaging device.

10. A processing system comprising:

the image processing apparatus of claim 1; and an output device configured to output character information contained in an image obtained by correcting a shape of the object based on the distance between the imaging device and the object.

* * * * *